United States Patent
Kim

(10) Patent No.: US 11,220,772 B2
(45) Date of Patent: Jan. 11, 2022

(54) CLOTHING TREATMENT DEVICE AND METHOD FOR CONTROLLING SAME

(71) Applicant: LG Electronics Inc., Seoul (KR)

(72) Inventor: Keunjoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 16/611,106

(22) PCT Filed: Jul. 4, 2018

(86) PCT No.: PCT/KR2018/007571
§ 371 (c)(1),
(2) Date: Nov. 5, 2019

(87) PCT Pub. No.: WO2019/009613
PCT Pub. Date: Jan. 10, 2019

(65) Prior Publication Data
US 2020/0157724 A1 May 21, 2020

(30) Foreign Application Priority Data

Jul. 4, 2017 (KR) .......................... 10-2017-0084663

(51) Int. Cl.
*D06F 33/36* (2020.01)
*D06F 37/16* (2006.01)
(Continued)

(52) U.S. Cl.
CPC .............. *D06F 33/36* (2020.02); *D06F 37/16* (2013.01); *D06F 34/05* (2020.02); *D06F 34/20* (2020.02);
(Continued)

(58) Field of Classification Search
CPC ...................................................... D06F 33/36
See application file for complete search history.

(56) References Cited

U.S. PATENT DOCUMENTS 9,818,007 B1 * 11/2017 Bajovic .................. D06F 33/00
2016/0201243 A1    7/2016 Bergamo

FOREIGN PATENT DOCUMENTS

EP            1959044        4/2010
KR     20-1998-063879        11/1998
(Continued)

OTHER PUBLICATIONS

Written Opinion of the International Search Authority dated Sep. 19, 2018.

*Primary Examiner* — Jason Y Ko
(74) *Attorney, Agent, or Firm* — Finnegan, Henderson, Farabow, Garrett & Dunner, LLP

(57) ABSTRACT

A laundry treating apparatus includes a tub configured to hold wash water, a drum rotatably supported in the tub and including a shaft disposed perpendicular with the ground, and a sub-drum detachably mounted to an inner circumferential surface of the drum and configured to wash laundry independently from the drum. An information tag is disposed in the sub-drum, the tag containing information about the laundry. A reading unit is configured to acquire the information about the laundry from the information tag. A control unit is configured to determine a washing course to be performed in the sub-drum based on the information acquired by the reading unit.

16 Claims, 15 Drawing Sheets

(51) Int. Cl.
*D06F 34/20* (2020.01)
*D06F 34/28* (2020.01)
*D06F 103/00* (2020.01)
*D06F 105/52* (2020.01)
*D06F 34/05* (2020.01)
*D06F 101/00* (2020.01)
*D06F 39/00* (2020.01)

(52) U.S. Cl.
CPC .............. *D06F 34/28* (2020.02); *D06F 39/00* (2013.01); *D06F 2101/00* (2020.02); *D06F 2103/00* (2020.02); *D06F 2105/52* (2020.02)

(56) References Cited

FOREIGN PATENT DOCUMENTS

| | | |
|---|---|---|
| KR | 10-1435795 | 8/2014 |
| KR | 10-2015-0106680 | 9/2015 |

* cited by examiner

CLOTHING TREATMENT DEVICE AND METHOD FOR CONTROLLING SAME

CROSS-REFERENCE TO RELATED APPLICATIONS

This application is a U.S. National Phase of PCT International Application No. PCT/KR2018/007571, filed on Jul. 4, 2018, which claims priority under 35 U.S.C. 119(a) to Korean Patent Application No. 10-2017-0084663, filed in the Republic of Korea on Jul. 4, 2017, the contents of all of which are incorporated by reference herein in their entireties.

FIELD

Embodiments of the present disclosure relate to a laundry treating apparatus and a control method of the same, more particularly, to a laundry treating apparatus which includes a sub-drum additionally mounted in a drum so as to perform laundry-treating in both of the drum and sub-drum.

BACKGROUND

Generally, a laundry treating apparatus includes a washer configured to perform washing, a dryer configured to perform drying and a laundry machine with washing and drying functions configured to perform both washing and drying.

Such a laundry treating apparatus is used as the washer may include a cabinet defining an external appearance; a tub mounted in the cabinet and configured to hold wash water; a drum rotatably provided in the tub and configured to wash clothes or laundry; and a door coupled to the door and provided to facilitate the loading and unloading of the clothes or laundry.

The laundry treating apparatus may be classified into a top loading type having a drum shaft which vertically stands with respect to the ground and a front loading type having the drum shaft which is horizontally arranged in parallel with the ground.

In the front type laundry treating apparatus, the drum shaft is substantially parallel with the ground and the washing is performed by using a frictional force between the laundry and the drum rotated by the drive force of a motor and the drop impact of the laundry, in a state where detergent, wash water and laundry are loaded in the drum. The drum washing method in the front loading type produces little damage to the laundry and little laundry entangling, while having a washing effect like hand-rubbing-and-striking.

In the top loading type laundry apparatus, the drum shaft is substantially vertical with respect to the ground and the drum is mounted in the tub where wash water is held. The washing is performed in a state where the laundry is submerged in the wash water supplied to the drum and the top loading drum laundry apparatus is categorized into a pulsator type and an agitator type. The pulsator type includes a pulsator which is rotatably oriented in a bottom of the drum configured to accommodate wash water and laundry and rotates the wash water and the laundry by rotating the pulsator so as to perform the washing. The agitator type includes an agitator which is projected from the bottom of the drum upwardly and rotates the wash water and the laundry by rotating the agitator so as to perform the washing.

The top loading type laundry treating apparatus is configured to perform the washing by using both the friction between the wash water and the laundry and the chemical action of the detergent which are facilitated by the rotation of the drum or the agitator or pulsator which is provided in the bottom of the drum to create water currents. Accordingly, wash water has to be supplied enough to submerge the laundry to perform the washing in the top loading type laundry treating apparatus and the top loading type laundry treating apparatus requires much wash water.

In the conventional laundry treating apparatus, a washing course, more specifically, the washing course configured of a wash cycle, a rinse cycle and a dry-spin cycle may be performed in one drum. If the laundry has to be sorted based on fabric materials, the washing course has to be performed at least two times and more operations of the laundry treating apparatus have to be performed. Accordingly, the conventional laundry treating apparatus has some disadvantages of detergent waste and energy consumption.

To solve such disadvantages, a laundry treating apparatus according to various embodiments of this disclosure may include a sub-drum detachably mounted in the drum. Such a sub-drum may accommodate water, independent from the tub, and water currents may be formed in the sub-drum by the rotation of the sub-drum so as to perform an additional washing course independently from a washing course performed in the drum.

Washing for the main-drum and washing for the sub-drum may be independently performed. More specifically, the wash water held in the main-drum may not be mixed with the water held in the sub-drum. If the wash water held in the main-drum and the sub-drum is mixed, there may be an issue with dyeing the laundry. Also, the detergent used for the laundry in the main-drum could be different from the detergent used for the laundry in the sub-drum.

More specifically, it may be desirable that the water supplied to either of the sub-drum or the drum is not mixed with water drained from the other of the sub-drum or the drum. Accordingly, a laundry treating apparatus is disclosed that may effectively facilitate such independent washing processes.

Meanwhile, the control of the laundry treating apparatus could be different according to whether the sub-drum is mounted in the main-drum. A structure is disclosed, wherein the structure is configured to easily mount the components for determining the presence of the sub-drum mounted in the main-drum. In addition, inner and outer surfaces of the main-drum and the sub-drum quite often contact with moisture or water. Accordingly, it may be desirable to provide a structure configured to protect such components from the moisture or water.

SUMMARY

Technical Problem

To overcome the disadvantages of conventional apparatus, an aspect of the present disclosure is to provide a laundry treating apparatus with a drum and a sub-drum, wherein the laundry treating apparatus may achieve a sufficient washing effect by using only the sub-drum.

Furthermore, another aspect of the present disclosure is to provide a laundry treating apparatus which may allow a user to additionally load laundry into the main-drum as well as the sub-drum.

Another aspect is to provide a laundry treating apparatus which may effectively discharge wash water from the sub-drum, without the discharged wash water being drawn into the main-drum.

Yet another aspect is to provide a laundry treating apparatus which may discharge the wash water held in the sub-drum only in a dry-spinning cycle, without discharging the wash water in a washing cycle. The laundry treating apparatus may include a water discharging structure without an auxiliary drive unit such as a drainage pump connected with the sub-drum.

Another aspect is to provide a laundry treating apparatus which may prevent water leakage to a sensor provided in a tub cover to sense the rotation of the sub-drum during the washing and which discharges the water collected in the tub cover fast, while preventing the water from flowing back up to an outlet hole provided to discharge.

Still another aspect is to provide a laundry treating apparatus which may easily mount the sensor to the tub cover without an additional component provided in the tub cover, which is provided in the conventional laundry treating apparatus.

A laundry treating apparatus according to aspects of this disclosure may include an integral structure configured to mount the sensor to the tub cover.

Technical Solution

A laundry treating apparatus according to exemplary embodiments of this disclosure comprises a tub configured to hold wash water; a drum rotatably supported in the tub and comprising a shaft which is perpendicular with the ground; a sub-drum detachably mounted to an inner circumferential surface of the drum and configured to wash laundry, independent from the drum; an information tag provided in the sub-drum and containing information about the laundry; a reading unit configured to acquire the information about the laundry from the information tag; and a control unit configured to determine a washing course that is performed in the sub-drum based on the information acquired by the reading unit.

The control unit may determine corresponding information about the laundry acquired by the reading unit as a washing course, which will be performed, out of a plurality of washing courses according to preset information about laundry.

Accordingly, a plurality of washing courses for the main-drum may be provided and a plurality of washing courses for the sub-drum may be provided. Thus, the washing of the laundry loaded in the main-drum and the washing of the laundry loaded in the sub-drum may be separately performed and the optimized washing course may be performed even in the sub-drum.

The control unit may determine that the sub-drum is mounted when the reading unit acquires information about the laundry from the information tag. That is because the information tag is provided in the sub-drum. When the information tag is read normally, it may be determined that the sub-drum is mounted normally.

The control unit may determine whether the sub-drum is mounted by using the information tag and the reading unit. In other words, two tips of information about the washing course for the sub-drum and the washing course for the main-drum may be figured out by using one configuration (e.g., the information tag). In this instance, the configuration for determining whether the sub-drum is mounted and the configuration for determining the washing course for the sub-drum may be separately provided.

A plurality of information tags may be provided according to a plurality of washing courses.

The plurality of the information tags may be detachably provided in the sub-drum, and a washing course corresponding to the attached information tag may be specified, once one of the information tags is attached to the sub-drum. In this instance, one of the information tags is attached to one sub-drum if necessary such that the user can select the washing course for the sub-drum.

The plurality of the information tags may be provided in the plurality of the sub-drums, respectively. In this instance, the user is able to select one of the sub-drums corresponding to a desired washing course for the sub-drum and mount the selected sub-drum to the main-drum.

The information tag may comprise a RFID (Radio Frequency Identification) tag, and the reading unit may receive information from the RFID tag.

The information tag may comprise a magnet tag having one or more magnets, and the reading unit may comprise a hall sensor configured to sense the magnets of the magnet tag.

The magnet tag may comprise a plurality of magnets arranged along a circumferential surface of the sub-drum, and the hall sensor may be provided in an upper end of the tub.

The combination of the plural magnets may provide plural tips of information about the washing courses. As one example, the plural tips of the washing courses may be provided based on the combination of the number of the mounted magnets or the combination of the angles between the mounted magnets. Such combinations may be read by the reading unit differently.

As another example, the sensed number of the magnets may be varied according to the number of the mounted magnets when the main-drum is rotated once.

As a further example, even when the same number of the magnets is mounted during the one rotation of the main-drum, the angles between the magnets may be varied.

Accordingly, the user is able to select the information about the washing courses by using the information tag having the magnets.

The reading unit may further comprise a rotation angle sensing unit provided in a lower end of the tub and configured to sense a rotation angle of the drum.

More specifically, the control unit may determine a washing course by acquiring the frequency sensed by the hall sensor while the drum is rotated to a preset angle.

More specifically, the magnet tag may include combinations of the number and positions of the mounted magnets and the control unit may determine the washing course by acquiring the sensing frequency of the hall sensor and the rotation angle of the drum measured between the sensing points of the hall sensor.

In another aspect of the present disclosure, a laundry treating apparatus comprises a tub configured to hold wash water; a drum rotatably supported in the tub and comprising a shaft which is perpendicular with the ground; a sub-drum detachably mounted to an inner circumferential surface of the drum and configured to wash laundry, independent from the drum; a control panel provided to allow a user to select a washing course performed by the drum; an information tag provided in the sub-drum to allow a user to select a washing course performed in the sub-drum; a reading unit configured to acquire information about the washing course for the sub-drum from the information tag; and a control unit configured to perform washing according to the washing course selected via the control panel and the washing course selected via the information tag.

Accordingly, the user is able to select a washing course for the drum and a washing course for the sub-drum.

In addition, a method for selecting the washing course for the drum may be different from a method for selecting the washing course for the sub-drum. Therefore, expanding or changing the control panel to select the washing course for the sub-drum may be minimized.

A plurality of information tags may be provided corresponding to a plurality of washing courses, and one of the information tags may be attachable to and detachable from the drum.

A plurality of information tags may be provided corresponding to a plurality of washing courses, and the information tags may be attached to the sub-drums, respectively.

The information tag may be provided corresponding to a plurality of washing courses according to a combination of the number of the mounted magnets, a combination of the positions of the mounted magnets and a combination including the number and positions of the mounted magnets.

The information tag may comprise a RFID tag, and the reading unit may receive information from the RFID tag.

The control unit may acquire information about the washing course for the drum via the control panel, and unless the reading unit acquires information about a washing course for the sub-drum, it may be determined that the sub-drum is not mounted and only the washing course for the drum is controlled to be performed.

The control unit may control the reading unit to acquire information about the washing course for the sub-drum, and unless the reading unit acquires information about the washing course for the drum via the control panel, the control unit may control only the washing course to be performed by the sub-drum.

Accordingly, the user is able to select one of the washing processes. The washing processes include one washing process performed only in the drum (a first mode); another washing process performed in both the drum and the sub-drum (a second mode); and the other washing process performed only in the sub-drum (a third mode). In other words, the user is able to select one of the three washing modes.

The first mode may be used in normal washing. The second mode may be used when separated washings are needed at the same time. The third mode may be used in washing a small amount of laundry. Meanwhile, in the second or third mode, the user is able to select the washing course for the sub-drum. Accordingly, the washing may be performed by using the optimized washing course, regardless of the washing modes.

Detailed characteristics of various disclosed embodiments may be combined in other embodiments.

Advantageous Effects

The disclosed embodiments have the following advantageous effects. According to the embodiments of the present disclosure, the laundry treating apparatus and the control method of the same may provide the optimal washing effect by using the sub-drum.

Furthermore, the laundry treating apparatus and the control method of the same may determine the optimal washing course even without further providing an auxiliary user interface related to the washing of the sub-drum.

Still further, the laundry treating apparatus and the control method of the same may automatically determine the washing course for the laundry loaded in the sub-drum only when the user mounts the sub-drum to the main-drum.

Still further, the laundry treating apparatus and the control method of the same may allow the user to select washing information about the sub-drum mounted to the main-drum and recognize and reflect the selected information.

Still further, the laundry treating apparatus and the control method of the same may determine whether the sub-drum is mounted to the main-drum and recognize information about the washing course of the sub-drum.

Still further, the laundry treating apparatus and the control method of the same may perform in both the main-drum and the sub-drum or only in the sub-drum, in a state where the sub-drum is mounted to the main-drum.

Still further, the laundry treating apparatus may automatically set a washing course of the sub-drum even unless the user selects the washing course of the sub-drum via a control panel.

DETAILED DESCRIPTION

Referring to the accompanying drawings, exemplary embodiments of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
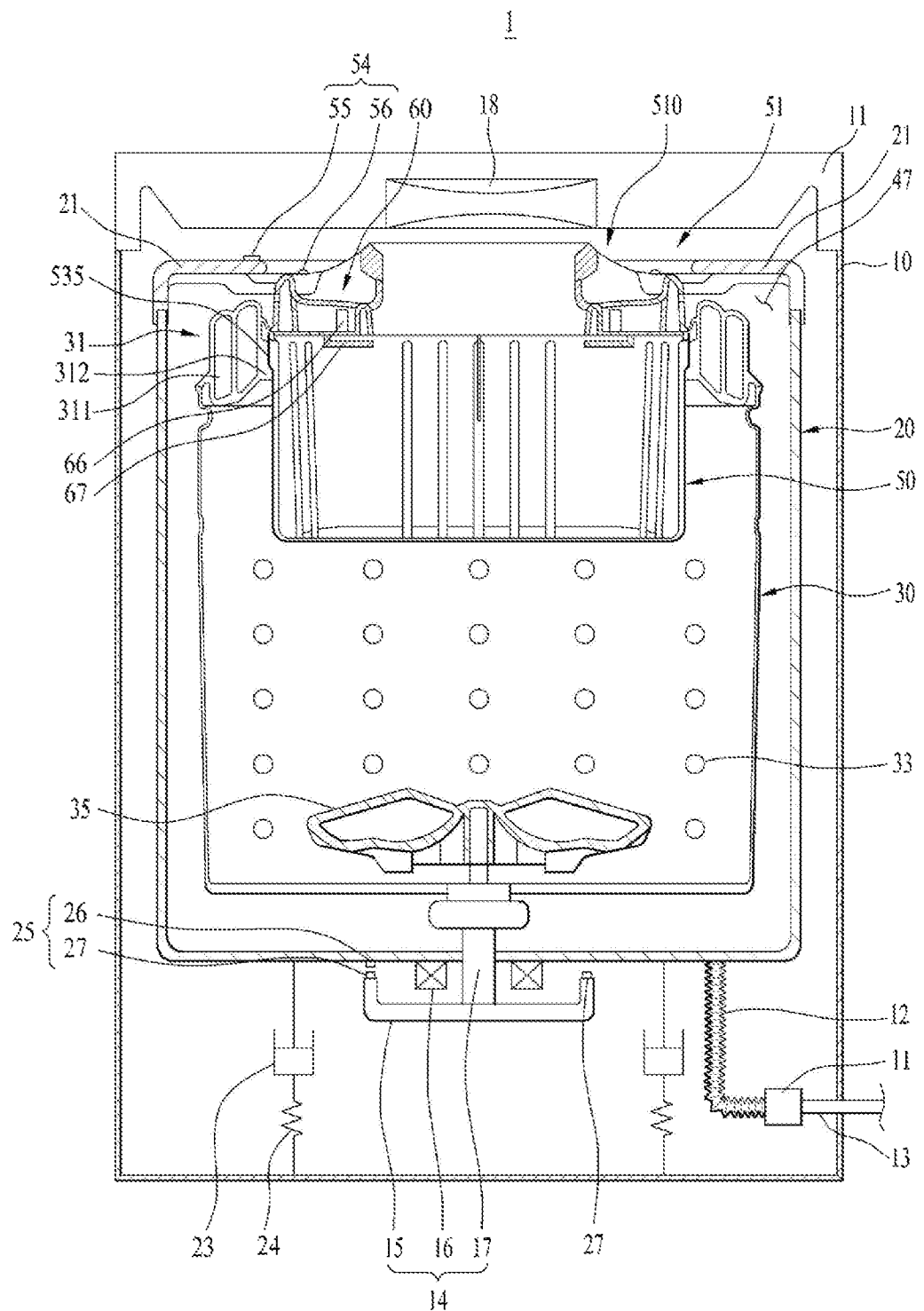
FIG. 1 is a schematic diagram illustrating a structure of a laundry treating apparatus in accordance with one embodiment of the present disclosure.

FIG. 1 is a schematic diagram illustrating a structure of a laundry treating apparatus 1 in accordance with one embodiment of the present disclosure;

Referring to FIG. 1, the laundry treating apparatus 1 in accordance with the embodiment includes a cabinet 10 having an opening formed in an upper portion to load clothes or laundry (hereinafter, the laundry); a door (not shown) coupled to the opening to open and close the opening; a tub 20 mounted in the cabinet 10 and configured to store wash water; and a drum 30 rotatably mounted in the tub 20.

The laundry treating apparatus may further include a drive unit 14 configured to drive the drum 30; and a pulsator 35 configured to rotate in the drum 30 so as to form water currents in the wash water supplied to the drum and the tub.

The drive unit 14 may be provided to selectively rotate the drum 30 and the pulsator 35.

Meanwhile, the laundry treating apparatus in accordance with the embodiment includes a sub-drum 50 detachably mounted in the drum 30 and configured to perform washing, independently from the washing in the drum 30.

In the embodiments of the present disclosure, the wash water for washing the laundry and the wash water for washing the door and the like are referred to as 'the wash water' and the drum 30 is referred to as 'the main-drum'.

FIG. 1 shows a direct-type motor drive structure which directly connects the motor to a shaft 17 to drive the drum 30. However, the laundry treating apparatus 1 in accordance with the illustrated embodiment is not limited thereto.

The cabinet 10 may define the exterior appearance of the laundry treating apparatus 1 and include a cabinet cover 11 having an opening to communicate the inside of the cabinet with the outside so as to load the laundry.

The cabinet cover 11 is provided in an upper end of the cabinet 10 and the door (not shown) is rotatably coupled to a top of the opening to selectively open and close the opening. Accordingly, a user is able to load or unload the laundry into or from the drum 30 and the sub-drum by opening and closing the door.

Meanwhile, a water supply unit 18 is provided in the cabinet cover 11 to supply the water mixed with detergent or clean water with no detergent to the drum 30 and the sub-drum 50. The wash water exhausted from the water supply unit 18 may be supplied to the drum 30 and/or the sub-drum 50.

The wash water exhausted from the water supply unit 18 may be supplied only to the drum 30 or only to the sub-drum 50. A laundry accommodating space of the drum 30 may be separated from a laundry accommodating space of the sub-drum 50, and the wash water supplied to the drum 30 may be separated from the wash water supplied to the sub-drum 50. In other words, the supply of the wash water supplied to the sub-drum 50 may be limited and the supply of the wash water to the drum 30 may be limited, because a contamination level or fabric type of the laundry loaded in the drum could be different from a contamination level or fabric type of the laundry loaded in the sub-drum. Accordingly, the laundry and the wash water supplied to the drum may be separated from the laundry and the wash water supplied to the sub-drum.

In an illustrated embodiment, the wash water is selectively supplied to the drum 30 or the sub-drum 50 via the inside of the tub 20 based on the rotation of the sub-drum 50. In other words, the wash water may be directly supplied to the internal space of the drum 30, not passing through the internal space of the sub-drum, and directly supplied to the internal space of the sub-drum 50, not passing through the internal space of the drum 30. The wash water supplied to the drum 30 and the wash water supplied to the sub-drum 50 are not mixed during the wash cycle and it is preferred that they are not mixed in the internal space of the drum 30 and the internal space of the sub-drum 50 even during the dry-spin cycle and the water drainage process.

The tub 20 is formed in a cylinder shape with an open top and mounted in the cabinet 10 to accommodate the wash water. The tub 20 includes a tub cover 21 installed to an upper end.

The tub cover 21 may be located higher than an upper end of the drum 30 and an upper end of the sub-drum 50 mounted in the drum 50. A laundry introduction opening 580 is formed in the tub cover 21, corresponding to the opening of the cabinet 10. The laundry may be loaded into the drum or the sub-drum via the laundry introduction opening 580.

A lower surface of the tub 20 is flexibly supported by a spring 24 and a damper 23 which are installed in the cabinet 10. As the lower surface is directly supported by the spring 24 and the damper 23, the tub 20 cannot be rotated and may not be provided with an auxiliary rotational force by the drive unit 14, separately from the drum 30. FIG. 1 shows that the spring 24 and the damper 23 are serially connected to the lower surface of the tub 20 and the embodiments of the present disclosure are not limited thereto. If necessary, the spring 24 and the damper 23 may be connected to the lower surface in parallel. Alternatively, the damper 23 may be connected to the lower surface of the tub 20 and the spring 24 may be connected to an upper surface of the tub 20 and vice versa.

A drainage mechanism configured to drain water may be connected to the lower surface of the tub 20. The drainage mechanism includes a drainage pump 11 for providing a power to drain the wash water held in the tub 20; a first drainage pipe 12 having one end connected to the lower surface of the tub and the other end connected with the drainage pump 11 so as to guide the wash water toward the drainage pump 11; and a second drainage pipe 13 having one end connected with the drainage pump 11 and the other end connected with one side of the cabinet 10 so as to drain the wash water outside the cabinet 10 from the drainage pump 11. The first drainage pipe 12 may be a bellows pipe not to transfer the vibration of the tub 20 to the drainage pump 11.

The drive unit 14 includes a motor configured of a rotor 15 and a stator 16; and a shaft 17 connected with the rotor 15. As a clutch (not shown) is provided in the drive unit 14, the drive force may be transferred to the drum 30 and the pulsator 35. For example, when the shaft 17 is selectively coupled to the drum 30 in a state of being fixed to the pulsator 35, the drive unit 14 may transfer the drive force to the pulsator 35 or both of the pulsator 35 and the drum 30. As another example, the shaft 17 is selectively coupled to the pulsator in a state of being fixed to the drum 30 and the drive unit 14 may then transfer the drive force to the drum 30 or both of the pulsator 35 and the drum 30.

As mentioned above, the shaft 17 may be fixed to one of the pulsator 35 and the drum 30 and selectively coupled to the other one. However, the shaft may be selectively coupled only to the pulsator 35 or the drum 30.

The laundry treating apparatus 1 in accordance with one embodiment includes the drum 30 rotatably mounted in the tub 20 and configured to hold clothes or laundry; and the sub-drum 50 detachably mounted in the drum 30.

The drum 30 may be formed in a cylinder shape with an open top and an approximately circular cross-section and a lower surface directly connected with the shaft 17 to receive the rotational force from the drive unit 14.

The drum 30 may be formed in the cylinder shape with the open top and a plurality of through-holes may be formed in a lateral wall, in other words, a circumferential surface. The drum 30 may be in communication with the tub 20 via the plurality of the through-holes 33. Accordingly, when wash water is supplied to the tub 20 to a preset water level or more, the drum 30 becomes submerged in the wash water and some of the wash water may flow into the drum via the through-holes 33.

The drum 30 includes a drum cover 31 provided in an upper end. The drum cover 31 is formed in a hollow ring shape and arranged in a lower area of the tub. An outlet path 47 is horizontally extended by the upper surface of the drum cover 31 and the lower surface of the tub cover 21. The outlet path 47 may be provided to guide the wash water exhausted outside via a lateral surface of the sub-drum 50 toward the inside of the tub 20 again.

The wash water held in the drum 30 is drawn toward inner and lower walls of the tub via the through-holes 33 of the drum 30 and then drained. The wash water held in the sub-drum 50 is drawn toward the inner wall of the tub via the top of the sub-drum 50. In other words, the wash water is flowing in a side gap between the drum 30 and the tub 20 via the outlet path 47 and then to the lower wall of the tub to be drained outside. Accordingly, the wash water held in both the drum 30 and the sub-drum 50 is not mixed with each other in the drum 30 and the sub-drum 50, when drained outside. Also, the wash water supplied to both the drum 30 and the sub-drum 50 is not mixed with each other.

The drum cover 31 has an opening so as to load the laundry or mount the sub-drum 50 therein. Also, the drum-cover 31 also has a balancer 311 provided to compensate the unbalance caused by the eccentric load of the laundry in the drum.

The drum cover 31 may include a first uneven portion 315 formed in an inner circumferential surface to facilitate the demounting of the sub-drum 50; and an hooking portion 312 projected from the inner circumferential surface to prevent the upward movement of the drum 30 by interfering with a coupling unit 93 of the sub-drum 50 which is provided to be coupled to the first uneven portion 315. In this instance, the coupling unit 93 is able to be flexibly movable into or from the sub-drum 50, in communication with a handle unit 510.

Figure 5:
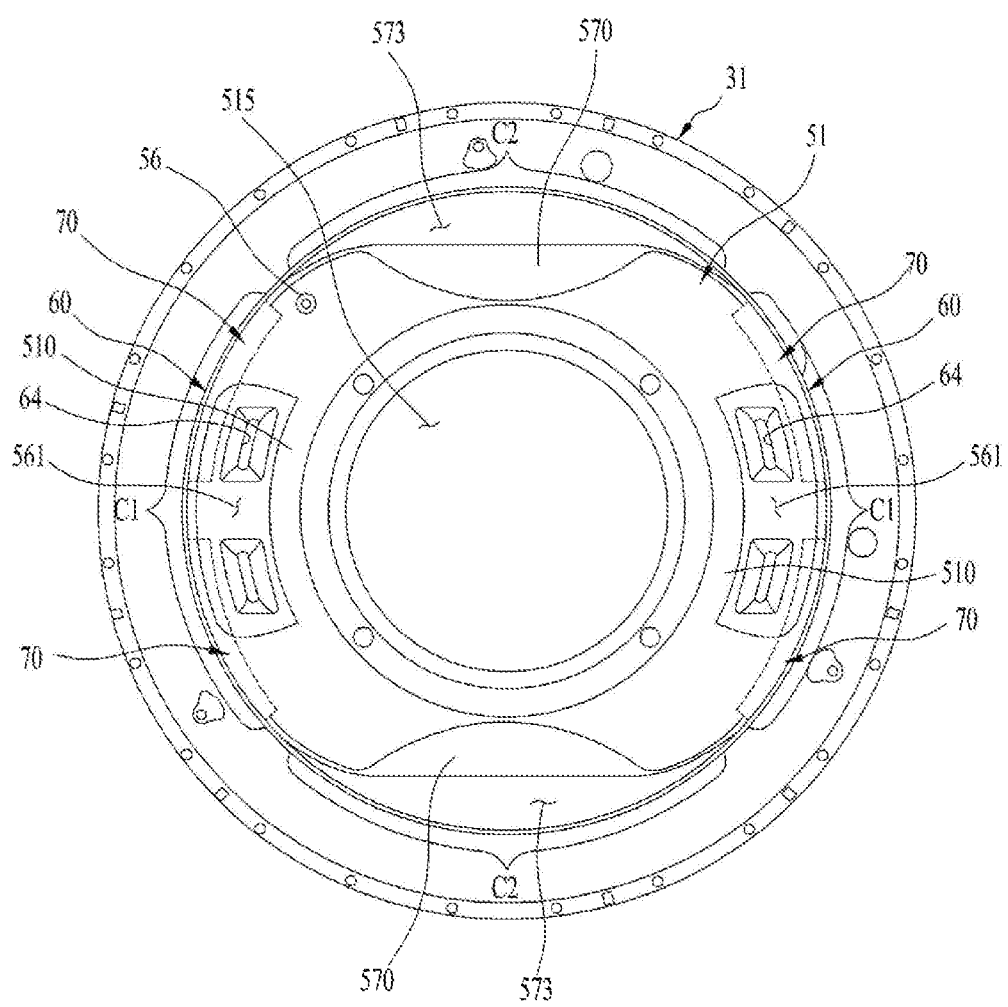
FIG. 5 is a plane view illustrating the sub-drum mounted in a drum.
Figure 6:
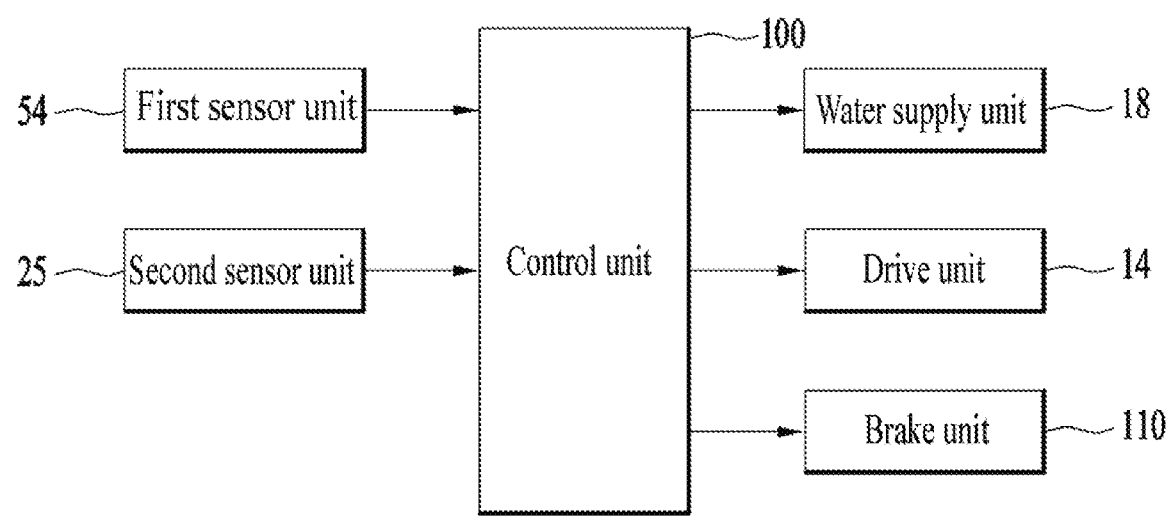
FIG. 6 is a block diagram illustrating the structure of the laundry treating apparatus in accordance with the embodiment.

Meanwhile, the laundry treating apparatus in accordance with the embodiment may include a control unit (500, see FIG. 5 and a brake unit (110, see FIG. 6) so as to control the overall washing process. Also, the laundry treating apparatus may include a sensor unit configured to control an angle of the sub-drum 50 which will be described later. The sensor unit may include a first sensor unit 54 and a second sensor unit 25. The angle control of the sub-drum 50 may be performed for the water supply. As one example, it may be determined based on the angle control of the sub-drum 50 whether to perform the water supply to the inside of the drum 30 via the same water supply unit or to the inside of the sub-drum 50.

The first sensor 54 may include a first hall sensor 55 and a first magnet unit 56. The first hall sensor 55 may be provided in an upper surface of the tub cover or an inner circumference of the tub cover 20. In other words, the first hall sensor 55 may be provided in one of the fixed elements. The first magnet unit 56 may be installed on an upper surface of the sub-drum to be sensed by the first hall sensor 55.

When the sub-drum 50 is rotated, the first hall sensor 54 senses the first magnet unit 56 and transmits a signal to the control unit 100. In the illustrated embodiment, one hall sensor and one magnet are provided in the first sensor unit 54 for easy understanding. However, the embodiments of the present disclosure are not limited thereto and the first sensor unit 54 may include a plurality of hall sensors and a plurality of magnets. Or, it may include one hall sensor and the plurality of the magnets. The plurality of the magnets may be arranged at intervals having a preset angle. When one magnet is provided in one hall sensor, the hall sensor may generate one magnet sensing signal per one rotation of the sub-drum 50. When three magnets are provided in one hall sensor, the hall sensor may generate three magnet sensing signals per one rotation of the sub-drum 50. The first sensor unit 54 may determine whether the sub-drum 50 is mounted in the drum 30. Also, the first sensor unit 54 may determine whether the sub-drum 50 is mounted in the drum 30 normally.

As one example, when the first hall sensor 54 generates three magnet sensing signals per one rotation of the drum 30, the first hall sensor 54 may generate only two magnet sensing signals. In this instance, it may be determined that the sub-drum 50 is mounted in the drum abnormally.

When it is determined that the sub-drum 50 is mounted in the drum 30 normally, the sub-drum 50 and the drum 30 may be integrally rotated as one body. In other words, the rotation angle of the sub-drum 50 may be controlled by controlling the rotation angle of the drum 30.

In this embodiment, the second sensor unit 25 may be provided to control the rotation angle of the drum 30. More specifically, the sensor unit 25 may be provided to sense the rotation angle of the drum 30 and the rotation angle of the drum 30 may be controlled based on the result of the sensing of the second sensor unit.

More specifically, the second sensor unit 25 may include one second hall sensor 26 and a second magnet unit 27 so as to sense the rotation angle of the drum 30. The second hall sensor 26 may be provided on a bottom surface of the tub 20 and magnets of the second magnet unit 27 may be arranged along an outer circumference of a top surface of the rotor 15 to be sensed by the second hall sensor 26. When the drum 30 is rotated, the second hall sensor 26 senses the rotation angle of the drum 30 and then transmits a signal to the control unit 100. To allow the second sensor unit 25 to sense the precise rotation angle of the drum 30, the magnets of the second magnet unit 27 are provided on the rotor 15 at the equidistant intervals. The more magnets are provided, the more precise rotation angle of the drum may be sensed. In other words, the rotation angle of the drum 30 is determined based on the rotation angle of the rotor 15 sensed by the second sensor unit 25. Meanwhile, the second sensor unit 25 may include the hall sensor fixedly provided on the stator; and a plurality of magnets provided on the rotor and rotatable together with the rotor.

Meanwhile, the rotation angle of the rotor 15 may be sensed without auxiliary sensor. In other words, the rotation angle of the rotor 15 may be sensed according to a sensorless method to determine the rotation angle of the drum 30. Such a sensorless method may be configured to allow a phase current of a preset frequency to flow to the motor and estimate the location of the rotor provided in the motor based on the output currents detected while the currents of the preset frequency flow to the motor. Such the sensorless method is well-known knowledge and detailed description thereof will be omitted accordingly.

The control unit 100 is configured to control the overall operation of the laundry treating apparatus (e.g., the wash cycle, the rinse cycle, the dry-spin cycle and the like) and operate the laundry treating apparatus according to the user's setting.

Especially, the control unit 100 may be implemented to receive the signals generated by the first sensor unit 54 and the second sensor unit 25 and control the drive unit 14 configured to rotate the drum 30, the water supply unit 18 configured to supply wash water and the brake unit 110 configured to apply a brake to the rotating drum 30 based on the received signals. The control unit may perform the control of the rotation angle of the sub-drum 50 based on the control of the rotation angle of the drum 30. In other words, the control unit may control the sub-drum 50 to stop at a desired rotation angle.

The brake unit 110 is implemented to stop the drum 30 by applying a brake to the rotating drum 30. In other words, the control unit may control the drum 30 and the sub-drum 50 to stop at a preset rotation angle.

Hereinafter, the sub-drum 50 will be described in detail, referring to FIGS. 2 through 5.

Figure 2:
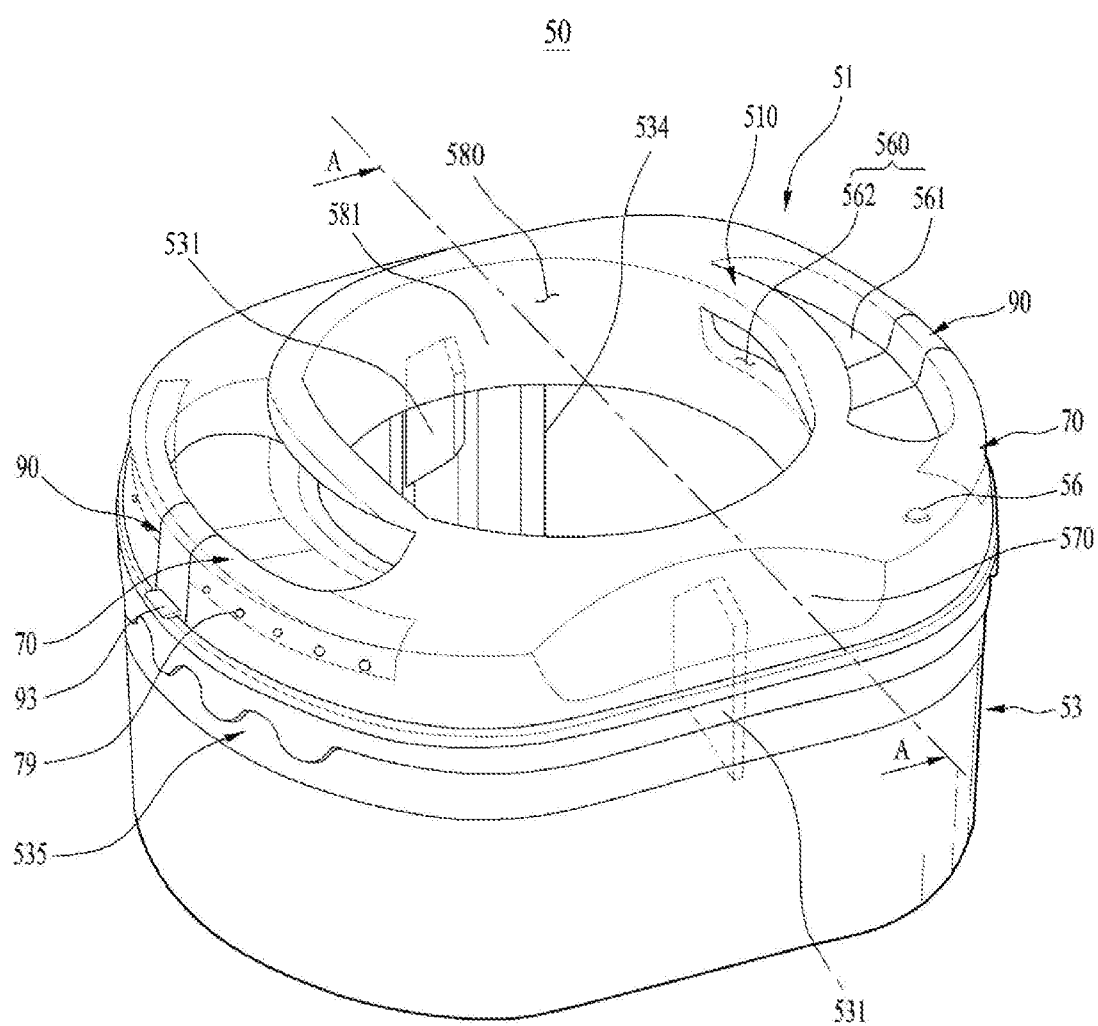
FIG. 2 is a perspective diagram illustrating a sub-drum which is shown in FIG. 1.
Figure 3:
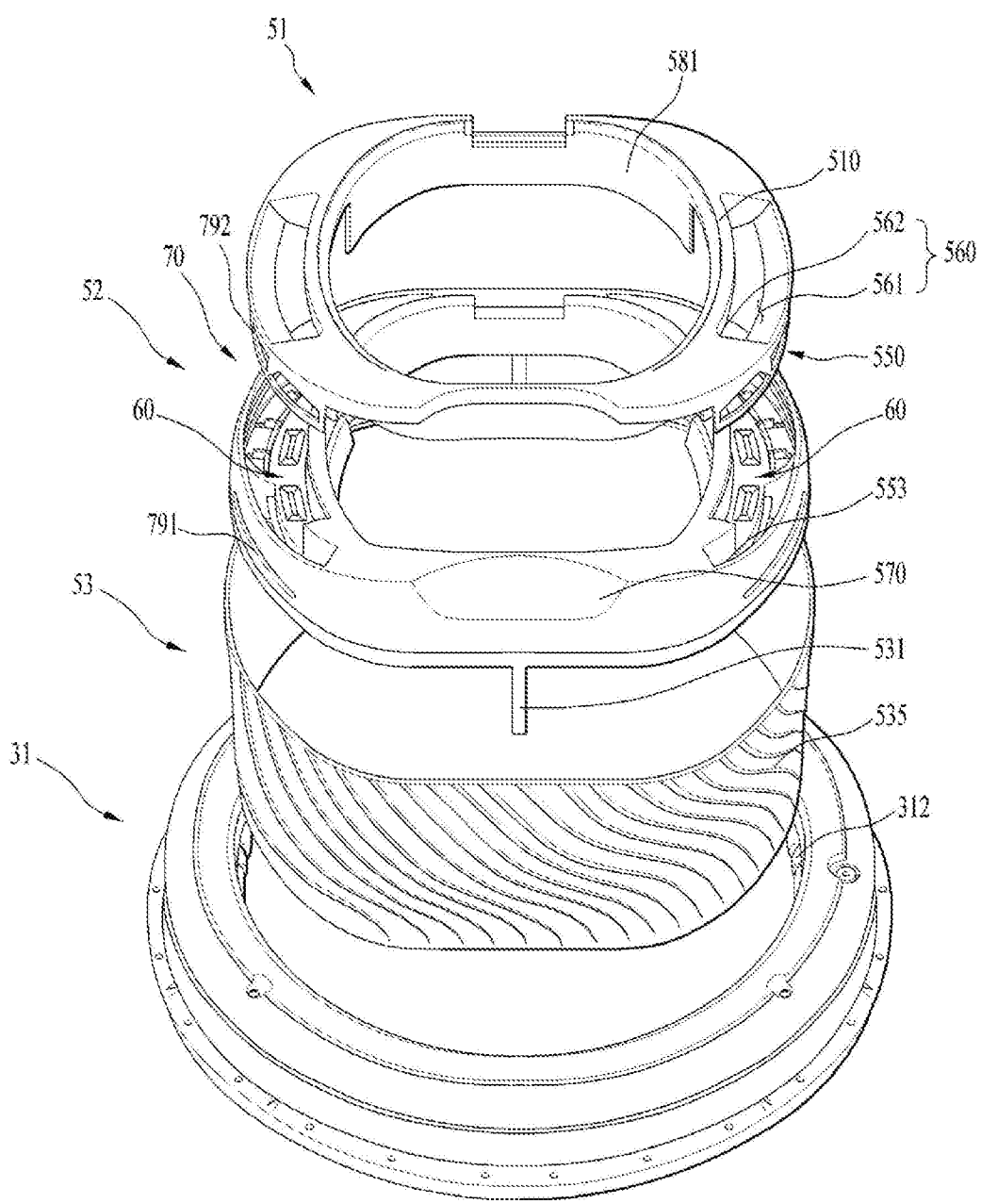
FIG. 3 is an exploded perspective diagram of the sub-drum shown in FIG. 1.
Figure 4:
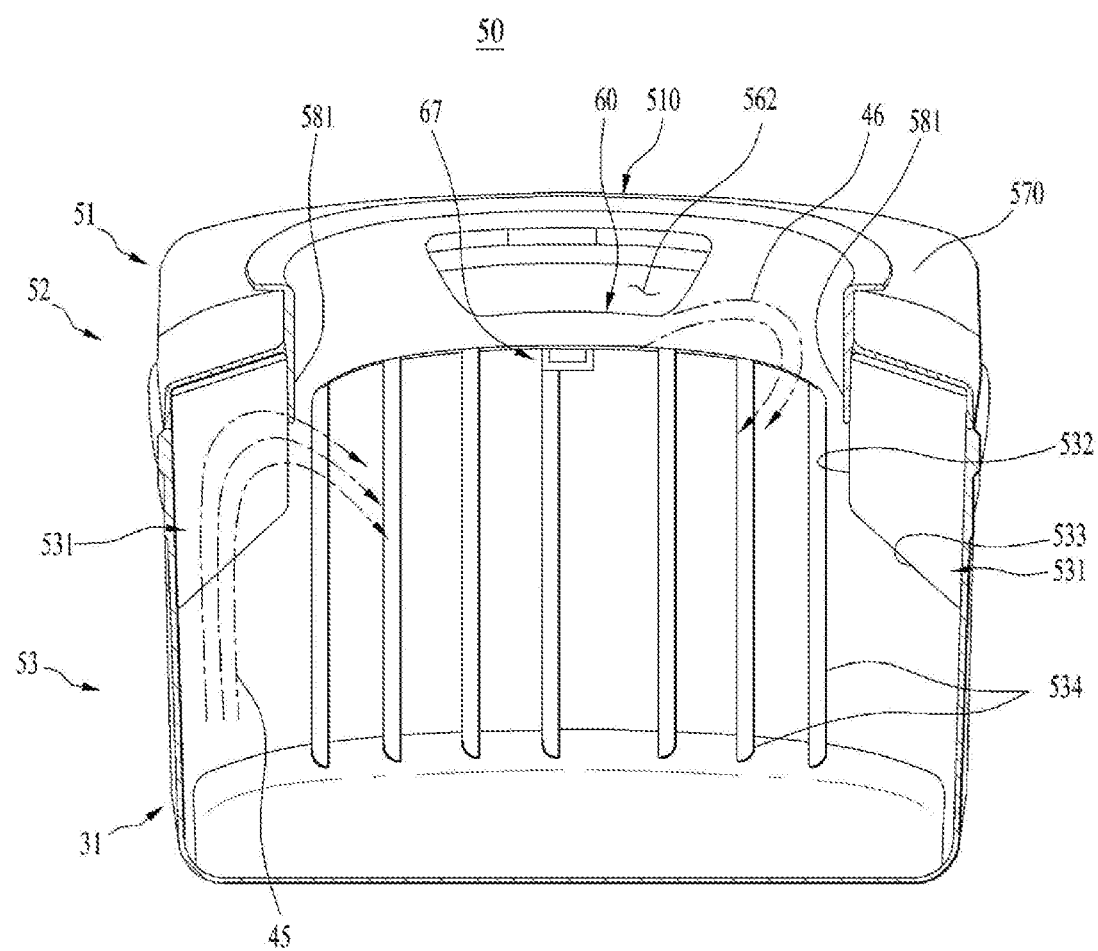
FIG. 4 is a sectional diagram along A-A line which is shown in FIG. 2.

FIG. 2 is a perspective diagram illustrating the sub-drum 50 which is shown in FIG. 1. FIG. 3 is a sectional diagram along A-A line which is shown in FIG. 2. FIG. 4 is a plane view illustrating the sub-drum 50 mounted in the drum 30. FIG. 3 is an exploded perspective diagram of the sub-drum shown in FIG. 1. FIG. 4 is a sectional diagram along A-A line which is shown in FIG. 2. FIG. 5 is a plane view illustrating the sub-drum mounted in a drum.

Referring to FIGS. 2 through 5, the sub-drum 50 may be detachably mounted in an upper end area of the drum 30. The sub-drum 50 has a kind of a container shape with an open top. The laundry may be loaded or unloaded through the open top. Also, wash water may be supplied to the internal space of the sub-drum via the open top and a cross section of the sub-drum may be formed in an approximately circular shape.

The sub-drum 50 may be configured to perform the washing, independent from the drum 30. After the laundry is sorted according to the color or fabric type and dividedly loaded into the drum 30 and the sub-drum 50 and washing is performed for the laundry supplied to the drum and the sub-drum simultaneously. Accordingly, the operation frequency of the laundry treating apparatus 1 may be reduced and the waste of the wash water, detergent and energy may be prevented at the same time. Also, the laundry may be sorted according to a contamination degree or the user's intended use of the laundry. As one example, laundry items such as lingerie or underwear may be dividedly washed from the laundry items which are used in cleaning such that the user's satisfaction level about the separated washing may be remarkably enhanced. In addition, the water supply and drainage may be separately performed and the separated washing effect may be substantially enhanced.

The sub-drum 50 may perform the washing while being rotated by the rotational force transmitted from the drum 30 such that no auxiliary drive device may be provided. That is because the sub-drum is integrally rotated together with the drum.

The sub-drum 50 includes a sub-drum body 53 formed in a cylinder shape with an open top; a sub-drum cover 51 detachably coupled to an upper end of the sub-drum body 53; an outlet unit 70 configured to exhaust the wash water held in the sub-drum 50 outside when the sub-drum 50 is rotated at a high speed; and a coupling unit 93 configured to couple and decouple the sub-drum 50 to and from the drum 30.

The sub-drum body 53 has an oval cross section so as to form a vortex in the wash water and a friction rib 534 may be provided in an inner circumferential surface of the sub-drum body 53 to form a water current in the wash water.

The top loading type laundry treating apparatus 1 in accordance with the embodiment may perform the washing process by using the chemical action of the detergent and the friction between the water currents formed by the rotation of the drum and the laundry. The sub-drum body 53 having the oval-shaped cross section may generate the vortex by using the rotation more efficiently than the drum having the circular-shaped cross section. As the vortex increases the friction between the wash water and the laundry, the sub drum 50 having the oval-shaped cross section may enhance the washing efficiency.

Meanwhile, the sub-drum body 53 may include an inner circumferential surface formed with a first curvature area (C1) having a first curvature and a second curvature area (C2) having a second curvature which is smaller than the first curvature, as shown in FIG. 5.

A pair of first curvature areas (C1) may be formed in the areas of the sub-drum body 53 which face each other, respectively, and the first curvature is identical to the curvature of the inner circumferential surface of the opening formed in the drum cover 31.

A pair of second curvature areas (C2) may be formed in the opposite areas of the sub-drum body 53 which face each other, respectively, with being located between the first curvature areas (C1). The second curvature may be smaller than the first curvature.

In other words, the first curvature areas (C1) and the second curvature areas (C2) may be alternatively provided along a circumference of the cross sectional surface formed in the sub-drum body 53.

The inner circumferential surface of the sub-drum body 53 may be divided into a short distance area (C2) spaced a first distance apart from the rotational center of the sub-drum 50; and a long distance area (C1) spaced a second distance apart from the rotation center of the sub-drum 50, the second distance farther than the first distance. The long distance area (C1) corresponds to the first curvature area (C1) and the short distance area (C2) corresponds to the second curvature area (C2).

Meanwhile, a first water supply path 573 which will be described later may be formed as the short distance area (C2) is spaced a sufficient distance apart from the inner circumferential surface of the drum-cover 31.

It is described that some area of the inner circumferential surface which the second curvature area (C2) indicates is curved but the embodiments of the present disclosure are not limited thereto. The area of the inner circumferential surface may be planar. In this instance, it is more appropriate that the second curvature area (C2) is named the short distance area (C2).

The first curvature area (C1), the second curvature area (C2), the long distance area (C1), the short distance area (C2), a coupling area (C1) and a distant area (C2) indicate specific areas. All of the areas which belong to the above-noted specific areas may be referred to as the terms mentioned above. In the disclosure, some areas of the sub-drum body 53 and the sub-drum body 51 are referred to as the above-noted terms.

It is shown in FIGS. 4 and 5 that the cross sectional surface of the sub-drum 50 is oval with respect to the overall height. However, the embodiments are not limited thereto. As one example, one short distance area (C2) may be formed or the short distance area (C2) may be formed only in the sub-drum body 53. In other words, the overall shape of the sub-drum cover 51 is circular and only the sub-drum body 51 provided in the lower area of the sub-drum cover 51 to hold wash water may have the short distance area (C2). Such the short distance area may define some space that vertically penetrates the drum from the drum upper portion into the drum inside. Accordingly, it is possible to form a penetrating area (not shown) in the sub-drum cover 51, corresponding to the short distance area.

Accordingly, as mentioned above, it is not necessary to form the overall shape of the sub-drum 50 in the oval shape so as to supply the wash water to the inside of the drum by vertically dropping the wash water via the water supply unit 18, without passing through the sub-drum 50. Any shapes are possible only if the short distance area for allowing the wash water to vertically flow is formed in the sub-drum body 51. The control of the drum rotation angle may be performed to locate such the short distance area to a corresponding area to the water supply unit 18.

Meanwhile, the sub-drum body 53 may include no through-holes 33 formed in the circumferential surface, different from the drum 30 including the through-holes 33 formed in the circumferential surface. Accordingly, the sub-drum body 53 may hold the wash water and the laundry and the wash water may not be exhausted into the drum 30 via the circumferential surface or lower surface. The wash water held in the tub 20 is only drawn into the drum 30 via the through-holes 33, not into the sub-drum 50.

The friction rib 534 may be projected from the inner circumferential surface of the sub-drum body 53 vertically. A plurality of friction ribs 534 may be spaced a preset distance apart from each other and integrally formed with the sub-drum body 53. The friction ribs 534 may be rotated the wash water in the rotational direction of the sub-drum body 53 by the frictional force with the wash water during the rotation of the sub-drum body 53. The friction ribs 534 are different from guide ribs 531, which will be described later, in the shape and functions.

The sub-drum cover 51 is coupled to an upper end of the sub-drum body 53, having a cross sectional surface which is equal to the cross sectional surface of the sub-drum body 53.

Accordingly, the circumferential surface of the sub-drum cover 51 may be divided into a first curvature area (C1) and a second curvature area (C2). The first curvature area (C1) may be named a first long distance area (C1) and the second curvature area (C2) may be named a second short distance area (C2). Different from the first and second curvature areas (C1) and (C2) of the sub-drum body 53, the first curvature area (C1) of the sub-drum cover 51 is coupled to the inner circumferential surface of the drum cover 31 and named a distant area (C2). Also, the second curvature area (C2) is spaced apart from the inner circumferential surface of the drum cover 31 and then named the distant area (C2).

The sub-drum cover 51 may include a laundry introduction opening 580 formed in an upper surface to introduce the laundry; and a handle unit 510 which provides a predetermined space to be grabbed by the user.

In addition, the sub-drum cover 51 may include an inner water supply guide 560 configured to guide the wash water exhausted from the water supply unit 18 into the sub-drum 50; and an outer water supply guide 570 configured to guide the wash water exhausted from the water supply unit into the drum 30 along an outer surface of the sub-drum 50.

The inner water supply guide 560 may function to guide the wash water supplied via the water supply unit 18 into the sub-drum smoothly, not into the drum simultaneously.

The outer water supply guide 560 may function to guide the wash water supplied via the water supply unit 18 into the drum smoothly, not into the sub-drum simultaneously.

The sub-drum cover 51 includes a guide rib 531 provided to lift the wash water circulating along the inner circumferential surface of the sub-drum body 53 after the flow direction is changed by collision and fall to the center of the sub-drum body 53.

The handle unit 510 may be formed in an upper surface of the sub-drum cover 51 and include a pair of handle units 510 facing each other.

The handle unit 510 may be arranged adjacent to the first curvature area (C1), in other words, the long distance area (C1) of the sub-drum cover 51. When the wash water is one-sided by the shock applied when the user demounts the sub-drum 50 from the drum 30, rolling might occur in a left-and-right direction while the sub-drum 50 is rotating on a virtual axis passing the pair of the long distance areas (C1). When the handle unit 510 is provided near the second curvature area (C2), in other words, the short distance area (C2), the user has to apply a strong force so as to steady the vertical vibration of the sub-drum 50 such that it may be more advantageous to locate the handle unit 510 near the long distance area (C1).

The inner water supply guide 560 is provided in an upper surface of the sub-drum cover 51, more specifically, the long distance area (C1), in other words, a coupling area (C1). The inner water supply guide 560 may include a concave area 561 and a water supply hole 562.

To form the concave area 561, some area is recessed from the upper surface of the sub-drum cover 51 not to spread the wash water exhausted from the water supply unit 18 around after being collided against the upper surface of the sub-drum cover 51.

The water supply hole 562 is formed in an inner surface of the concave area toward the laundry introduction opening 580 to communicate the concave area 561 with the laundry introduction opening 580. Accordingly, as the wash water is guided to the laundry introduction opening 580 via the water supply hole 562 from the concave area 561, the water supply hole 562 may form a second water supply path 562 to guide the wash water to the sub-drum 50.

The wash water exhausted from the water supply unit 18 is temporarily stored in the concave area 561 such that the wash water may not be spread around the sub-drum cover 51 and then exhausted to the laundry introduction opening 580 via the water supply hole 562, in other words, the second water supply path 562 to be guided into the sub-drum 50.

Meanwhile, the concave area 561 and the water supply hole 562 may be formed in a lower area of the handle units 510 such that the spatial efficiency of the sub-drum cover 51 can be maximized.

The outer water supply guide 570 may be provided in the sub-drum cover 51, preferably, the short distance area (C2), in other words, the distant area (C2). More specifically, the outer water supply guide 570 may be spaced apart from the inner water supply guide 560. The sub-drum 50 may be rotated a preset angle together with the drum 30, to locate the inner water supply guide 560 and the outer water supply guide 570 under one water supply unit 18. Accordingly, even when the outer water supply guide 570 is separated from the inner water supply guide 560, the wash water exhausted from one water supply unit 18 may be supplied to the drum 30 and the sub-drum 50, respectively.

The outer water supply guide 570 is formed by recessing a corner of the distance area (C2) into the sub-drum cover 51 and a bottom surface is inclined outwards and downwards with respect to the sub-drum cover 51. The wash water exhausted from the water supply unit 18 may be guided into the drum 30 along the first water supply path 573 defined as the space formed between the distant area (C2) and the outer circumferential surface of the drum 30.

The guide rib 531 may be formed in a plate shape and provided under the upper surface of the sub-drum cover 51, being extended downwards. The guide rib 531 has one surface contacting with the inner circumferential surface of the sub-drum body 53. More specifically, the plate-shaped guide rib 531 has the top coupled to the sub-drum cover and one side surface in contact with the inner circumferential surface of the sub-drum body 53. Accordingly, the wash water held in the sub-drum body 53 is rotated along the inner circumferential surface of the sub-drum body 53 by the rotational force of the sub-drum 50 and the flow direction of the wash water is changed by the collision with the guide rib 531 to flow upwards and fall down to the center of the sub-drum 50 in an arc.

More specifically, the guide rib 531 may be formed in one surface toward the side surface toward the center of the sub-drum body 53. The guide rib 531 may include a rib vertical area 532 downwardly extended from the upper surface of the sub-drum cover 51; and a rib inclined area 533 formed in a lower surface toward the bottom of the sub-drum body 53, downwardly extended from the rib vertical area and the center of the sub-drum 50 toward the inner circumferential surface.

The rib inclined area 533 is spaced apart from the lower surface of the sub-drum body 53, while forming an acute angle with the inner circumferential surface of the sub-drum 50.

As the rib inclined area 533 is formed in the lower surface of the guide rib 531, the laundry rotated and flowing in the inside of the sub-drum body 53, together with the wash water, may be less interfered with. Accordingly, the flow of the laundry may be performed more efficiently and the friction between the laundry items may be increased enough to enhance the washing efficiency or performance.

Meanwhile, even if the rib inclined area 533 is formed in the guide rib 531, a sufficient amount of wash water can be lifted. For example, when the sub-drum 50 is rotated at a high speed, a water level of the wash water held in the inner circumferential surface of the sub-drum body 53 is higher than a water level of the wash water held in the center of the sub-drum body 53. Accordingly, even if the rib inclined area 533 is formed in the guide rib 531, sufficient wash water can be collided with the guide rib 531 to be lifted.

Meanwhile, when the sub-drum 50 is rotated at a relatively low speed, the guide rib 531 may be arranged in the short distance area (C2) of the sub-drum cover 51 to lift a sufficient amount of wash water. The amount of the wash water passing through a virtual section from the center of the sub-drum body 53 to the short distance area (C2) is equal to the amount of the wash water passing through a virtual section from the center of the sub-drum body 53 to the long distance area (C1). Accordingly, the water level of the wash water when passing through the virtual section to the short distance area (C2) from the center of the sub-drum body 53 is higher than the water level of the wash water when passing through the virtual section to the long distance area (C1) such that the guide rib 531 can lift the sufficient amount of the wash water even when the sub-drum 50 is rotated at the low speed.

The guide rib 531 has one surface configured to collide with the wash water and the other opposite surface, which are upwardly inclined toward the flow direction of the wash water. In other words, when viewing the guide rib 531 from the center of the sub-drum body 53 in a radial direction, the width of the lower cross section may be larger than the width of the upper cross section. Accordingly, the wash water may be lifted along the one surface and the other surface of the guide rib 531 more efficiently.

By experiments, it is shown in FIG. 3 that the high washing efficiency is generated together with an inclined guide, when the horizontal length and the height of the sub-drum 50 is 399 mm and 309.2 mm and the height (H) and the width (W) of the guide rib 531 are 70 mm and 65 mm. When the experiment is performed in a state the height (H) of the guide rib 531 is set as 50 mm and 90 mm with the other values are the same, more enhanced washing performance is gained for some contaminants but an average of the values is lower than an average when the height (H) of the guide rib 531 is set as 70 mm meanwhile, such the values are just one example gained by the experiments and specific values of the sub-drum 50 and the guide rib 531 are not limited thereto.

The pair of the guide ribs 531 is provided in the short distance area (C2), respectively, as mentioned above, and the embodiments are not limited thereto. More guide ribs 531 are provided in the long distance area (C1) to be two pairs.

The incline guide 581 may be provided above the guide rib 531 and downwardly inclined to the inside of the sub-drum 50. More specifically, the inclined guide 581 is formed along an inner area, in other words, an inner circumferential surface of the laundry introduction opening 580 provided above the guide rib 531.

Without the inclined guide 581, the wash water lifted by the guide rib 531 flows to an upper area of the inner circumferential surface of the sub-drum body 53 and then a lower area of the upper surface toward the center of the sub-drum body 53. After that, the wash water falls into the sub-drum body 53 freely, while drawing an arc.

When the inclined guide 581 is installed, the wash water will not fall freely. In other words, the wash water horizontally flowing along the lower area of the upper surface of the sub-drum cover 51 may form the flow 45 of which a direction is drastically changed downwards by the lower surface of the inclined guide 581. More specifically, the horizontal component speed is partially changed into the vertical component speed. The wash water of which the flow direction is drastically changed is collided against the laundry loaded in the sub-drum body 53 more strongly than the wash water falling down freely. At this time, the inclination angle ($\theta$) of the inclined guide 581 may be set as approximately 10 degrees with respect to the direction of gravity. The angle at which the flow direction of the wash water is changed may be set larger. Accordingly, a stronger shock may be applied to the laundry loaded in the sub-drum body to enhance the washing performance.

It is described that the inclination angle ($\theta$) is approximately 10 degrees and such the value is one of examples, not limited thereto.

Meanwhile, when the sub-drum 50 is rotated at a high speed, the wash water held in the sub-drum 50 could collide with each other to splash to the laundry introduction opening 580. At this time, the inclined guide 581 is configured to guide the splashed wash water into the sub-drum 50 along the upper surface so as to form the flow 46 to the sub-drum 50.

The sub-drum 50 has a second uneven area 535 formed in an outer circumferential surface to be seated on an inner circumferential surface of a balancer 311 while engaging with a first uneven area 315 formed in the balancer 311. Such the second uneven area 535 may be formed in the coupling area (C1) of the outer circumferential surface of the sub-drum body 53. It is preferred that the second uneven area 535 is not formed in the outer circumferential surface of the sub-drum cover 51. The wash water held in the sub-drum body 53 and the weight of the laundry might separate the sub-drum cover 51 from the sub-drum body 53.

The first uneven area 312 is projected from the inner circumferential surface of the drum cover 31. In addition, projections are upwardly projected from an upper end of the first uneven area 312. The first uneven area 312 is formed over the circumference of the inner circumferential surface of the drum cover 31.

The second uneven area 535 is projected from the outer circumferential surface of the sub-drum. The outer circumferential surface of the sub-drum is divided into a short distance area C2 and a long distance area C1. The long distance area may be coupled to the inner circumferential surface of the drum cover such that the second uneven area 535 may be formed in the long distance area. Projections are continuously and downwardly projected from a lower end of the second uneven area 535. The projections of the second uneven area 535 are configured to engage with the projections of the first uneven area 312.

Accordingly, the rotational force of the drum 30 may be transferred to the sub-drum 50 and the sub-drum 50 may be also rotated together with the drum 30. Meanwhile, the sub-drum 50 includes a discharging area 70 for discharging the water from the sub-drum 50 while the sub-drum 50 is rotated at a high rotation number. The discharging area 70 is projected adjacent to a first curvature C1, in other words, the long distance area C1 and performs a function of selectively discharging the wash water held in the sub-drum 50 outside by the size of the centrifugal force generated during the rotation of the sub-drum 50.

As described above, the washing process performed by the sub-drum 50 is independently separated from the washing process performed by the drum 30. For that, water supply to the drum 30 has to be separated from water supply to the sub-drum 50. Moreover, the wash water supplied to the sub-drum 50 has to be held in the sub-drum 50 prevent the water from flowing into the drum 30 and the water has to be discharged from the sub-drum 50 in a drainage process and a dry-spinning process.

In other words, the sub-drum 50 has to hold wash water when rotated at a washing rpm to perform the washing and discharge the water when rotated at a dry-spinning rpm which is higher than the washing rpm.

At this time, the discharging area 70 is configured to discharge the water outside only when the centrifugal force generated by the rotation of the sub-drum 50 at the dry-spinning rpm higher than the washing rpm.

The discharging area 70 has a chamber (not shown) which accommodates water; an inlet hole (not shown) provided to draw water; and an outlet hole 79 provided to discharge the water from the chamber.

The discharging area 70 may be spaced a preset distance from a lateral wall of the sub-drum 50 in an inner radial direction, while the inlet hole is provided in a bottom surface of the chamber. Accordingly, the entire area of the inlet hole is smaller than the area of the chamber bottom surface with which the water is collided and a first resistance is generated when the water is drawn via the inlet hole. After that, a second resistance is additionally generated to raise the water against the centrifugal force, after flowing outside with respect to a radial direction.

Moreover, the discharging area 70 has the outlet hole 791 provided above the inlet hole and penetrating the lateral wall of the sub-drum 50. Accordingly, when water is drawn into the chamber via the inlet hole, a third resistance is additionally generated to flow outside the radial direction of the sub-drum 50 and then to raise the water against the gravity.

Accordingly, when the sub-drum 50 is rotated at the washing rpm which is lower than the dry-spinning rpm, the wash water may not be discharged from the sub-drum 50. In other words, the wash water is set to be selectively discharged only when the sub-drum 50 is rotated at preset dry-spinning rpm. Of course, such selective discharging may be facilitated even without the configurations including a drainage valve or a drainage pump provided as control objects.

Meanwhile, the sub-drum 50 may include a body 53 configured to hold water and laundry; and a sub-cover coupled to an upper surface of the body 53 and having a laundry introduction opening 515 for loading the laundry.

In this instance, the second uneven area 535 is provided in an outer circumferential surface of the body 53 so as to prevent the sub-cover from being separated from the body 53 by the weight of the water and laundry loaded in the body 53. In addition, the discharging area 70, the guide rib 531, the handle unit 510, the inner water supply guide 560 and the outer water supply guide 570 may be also provided in the sub-cover.

Meanwhile, the sub-cover may be integrally formed as one body. Alternatively, as shown in FIG. 2, the sub-cover may include a lower cover 52 coupled to the upper end of the body 53; and an upper cover 51 coupled to a top of the lower cover 52.

The chamber (not shown) of the discharging area 70 is defined by the coupling between the lower cover 52 and the upper cover 51. In this instance, the inlet hole is provided in the lower cover 52. The outlet hole 79 may include a first outlet hole 791 provided in an upper end of the lower cover 52; and a second outlet hole 792 provided in an upper end of the upper cover 51. Accordingly, after water is drawn into the chamber via the inlet hole, the water is discharged via the outlet hole 79 configured of the second outlet hole 792 and the first outlet hole 791.

The concave area 561 forming the inner water supply guide 560 may be defined by the coupling between the lower cover 52 and the upper cover 51. An upper surface of the lower cover 52 may form a bottom surface of the concave area 561 and some inserted area of the upper cover 51 may form an inclined surface of the concave area 561. The water supply hole 562 forming the inner water supply guide 560 may be defined by the space distance from the handle unit 510 and the upper surface of the lower cover 52.

Meanwhile, a control method of the laundry treating apparatus 1 in accordance with one embodiment may determine whether the sub-drum 50 is mounted in the drum 30 before starting the washing or performing the water supply for the washing. Also, the control method may determine whether the sub-drum is mounted normally and it may be performed by using the first sensor unit 54.

In this instance, the control unit 100 performs preset determination processes based on the sensing signal transmitted from the first sensor unit 54 and the second sensor unit 25 or the sensing signal transmitted from the first sensor unit 54 and the output currents detected while predetermined frequency currents are flowing to the motor and control the water supply unit 18, the motor 14 and the brake unit 110 based on the result of the determination processes. The sensing signal transmitted from the second sensor unit 25 and the output currents detected while the preset frequency currents are flowing to the motor are used when the control unit 100 measures the rotation angle of the drum 30. Hereinafter, for easy and convenient description, the second sensor unit 25 is exemplified as the element configured to sense the rotation angle of the drum. Detailed description about the relation between the elements for the water supply will be omitted.

Meanwhile, the embodiment for the location control of the drum 30 and the sub-drum 50 to supply wash water is described. However, the location control of the drum 50 and the sub-drum 50 for the location control of the handle units 510 may be performed.

The user is able to separate the sub-drum 50 from the drum 30 while holding the handle units 510. Accordingly, it is preferred that the handle units 510 are determined to allow the user to easily grab the handle units 510 from the surface of the laundry treating apparatus. The location control of the drum 30 may be performed to locate the handle units 510 at a desired position.

More specifically, the location control of the sub-drum 50 may be performed at a place where the sub-drum 50 is decoupled. As one example, the location control may be performed to pause or end the washing course.

When the sub-drum 50 is mounted in the drum 30 only at a specific location, the location control of the drum may be performed for an easy coupling process. As one example, the location control may be performed to pause the washing without the sub-drum 50 or start and end the washing without the sub-drum 50.

In other words, the rotation location control of the drum and/or sub-drum 50 (the stopping of the drum and/or sub-drum 50 at a preset location) may be performed for the water supply and for easy and convenient mounting and/or demounting of the sub-drum.

Meanwhile, the laundry treating apparatus may be configured to perform one or more washing courses and include an auxiliary control panel configured to allow the user to select the washing courses. The control panel may include an input unit configured to receive diverse washing course inputs and a display unit configured to display the input washing courses.

On such the control panel may be provided the washing courses for the laundry loaded in the drum and no washing courses for the laundry loaded in the sub-drum 50. In this instance, once the sub-drum 50 is mounted, the laundry treating apparatus 1 may determine and implement a corresponding washing course to the sub-drum 50 out of the preset washing courses.

Accordingly, when trying to use the sub-drum 50 after mounting the sub-drum 50 in the conventional laundry treating apparatus 1 having no sub-drum 50, the user is able to use the control panel of the conventional laundry treating apparatus without change or fixing.

Figure 7:
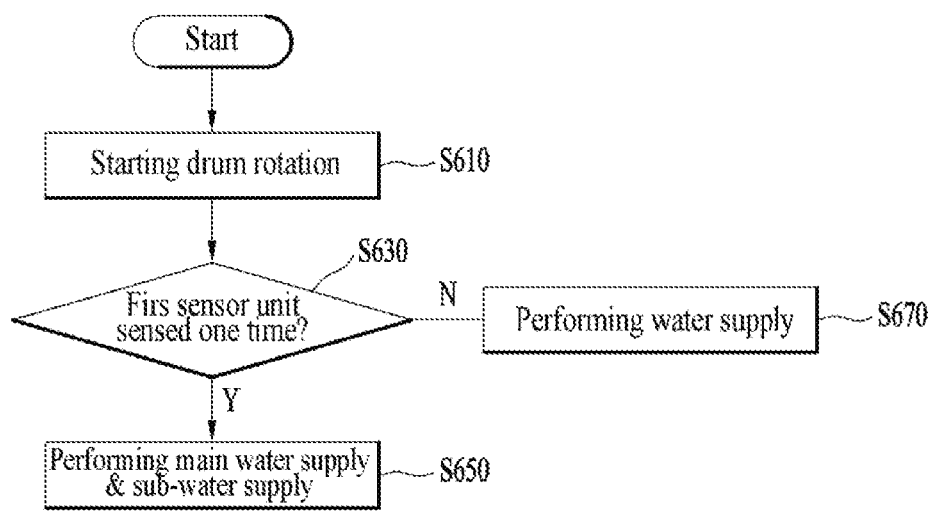
FIG. 7 is a flow chart illustrating a step for determining whether the sub-drum is mounted in the drum.

Referring to FIG. 7, the control method in accordance with one embodiment will be described in detail.

It has to be determined whether the washing course is performed only in the drum 30 or the sub-drum 50. For that, the drum is rotated (S610) and the drum is rotated to determine whether the sub-drum 50 is mounted or whether the sub-drum 50 is normally mounted. It can be said that such determination is performed to determine whether to supply wash water only to the drum 30 or both of the drum 30 and the sub-drum 50.

More specifically, the control unit 100 is implemented to control the drive unit 14 to rotate the drum 30. When the drum 30 is rotated, the second sensor unit 25 senses the rotation angle of the drum 30 and transmits a signal to the control unit 100.

Meanwhile, when a normal signal is not received from the first sensor unit, it may be determined that the sub-drum is not mounted or that the sub-drum is mounted abnormally. As one example, when receiving no signal from the first sensor unit 54 while the second sensor unit 24 senses that the rotation angle of the drum 30 is 360 degrees, the control unit 100 may determine that the sub-drum 50 is not mounted in the drum 30 (S630-N).

When determining that the sub-drum 50 is not mounted in the drum 30, the control unit 100 is implemented to control the water supply unit 18 to supply wash water to the drum 30 (S670). In this instance, the location control of the drum 30 for the water supply may not be performed. In other words, the control unit 100 may not control the drive unit 18 and the brake unit 110 to locate the outer water supply guide 570 or the inner water supply guide 560 under the water supply unit.

When it is determined that the sub-drum 50 is mounted abnormally, an alarm may be provided.

Meanwhile, when a normal signal is received from the first sensor unit, it may be determined that the sub-drum is mounted normally. As one example, when receiving the signal from the first sensor unit 54 while the second sensor unit 25 senses that the rotation angle of the drum 30 is 360 degrees, the control unit 100 may determine that the sub-drum 50 is mounted in the drum 30 (S630-Y).

Once determining that the sub-drum 50 is mounted in the drum 30 normally, the control unit 100 is implemented to perform the location control of the sub-drum 50 so as to supply wash water.

As one example, the control unit performs a main water supply to the drum 30 by locating the outer water supply guide 570 under the water supply unit 18. The control unit 100 may perform a sub-water supply configured to rotate the sub-drum 50 a preset angle and then locate the main water supply and the inner water supply guide 560 under the water supply unit 18 (S650). Of course, the main-water supply may be performed after the sub-water supply.

Once the water supply starts, wash water is exhausted via the water supply unit 18. The exhausted wash water is supplied to the sub-drum 50 via the water supply guide 560 and to the drum 30, in other words, the tub 20 via the outer water supply guide 570. In other words, the water supply is performed after the angle control is performed configured to locate the inner water supply guide 560 and the outer water supply guide 570 under the water supply unit 18 by rotating the sub-drum 50.

For example, the control unit 100 may control the drive unit 14 to rotate the sub-drum 50 at a low rpm for the water supply. In this instance, the rpm is set as '3'. When the first sensor unit 54 transmits a sensing signal to the control unit 100, the control unit 100 may rotate the sub-drum 50 a preset angle from the moment when the first sensor unit 54 sends the sensing signal and locate the outer water supply guide 570 under the water supply unit 18. Such the rotation angle is preset according to the arrangement relation among the first sensor unit 54, the outer water supply guide 570 and the water supply unit 18.

The rotation angle of the sub-drum 50 is measured by the second sensor unit 25 and transmitted to the control unit 100, while the sub-drum 50 is rotated at a very low rpm. The control unit 100 controls the brake unit 110 to stop the sub-drum once determining that the measured rotation angle reaches a preset rotation angle.

As the rpm of the sub-drum 50 is very low, the distance of the sliding sub-drum 50 from the point when the brake unit 110 starts is so small to be ignored. When the sub-drum 50 is stopped by the brake unit 110, the outer water supply guide 570 is almost located under the water supply unit 18. Accordingly, the wash water exhausted from the water supply unit 18 may be supplied to the drum 50 via the outer water supply guide 570, without correcting the location of the sub-drum 50.

Meanwhile, as the rpm of the sub-drum 50 is very low, the control unit 100 may cut off the currents flowing to the drive unit from the point or in a preset time period when the first sensor unit 54 senses the location of the sub-drum 50. At this time, the sub-drum 50 may move by the inertia. However, the angle of the rotation caused by the inertia at the low rpm may be so small to be ignored or expected from the current cut-off point. The stopping location of the sub-drum may be expected at the current cut-off point based on the rpm and the location of the sub-drum at the sensing point of the first sensor unit. The location control of the sub-drum 50 may become simpler on the assumption that there is no big error of the expected location.

The braking caused by the rotation of the sub-drum 50 to supply wash water via the inner water supply guide 560 is equal to the braking caused by the rotation of the sub-drum 50 to supply wash water via the outer water supply guide 570 mentioned above, such that detailed description thereof can be omitted.

Meanwhile, as another example for the precise location control of the sub-drum 50, the control unit 100 may control the drive unit 14 to slidingly move the sub-drum 50 from the point when the brake is applied to the sub-drum by raising the rpm of the sub-drum 50. In this instance, the rpm may be set as '15~25' and the embodiments are not limited thereto.

In this embodiment, the rotation angle to locate the outer water supply guide 570 under the water supply unit 18 when the first sensor unit 54 transmits a sensing signal may be also preset according to the arrangement relation among the first sensor unit 54, the outer water supply guide 570 and the water supply unit 18. However, in the preset rotation angle of this embodiment may be set to be the same value with the preset rotation angle in the above-noted embodiment. Considering the sliding distance of the sub-drum, the preset rotation angle of this embodiment may be smaller than that of the above-noted embodiment.

Similar to the above-noted embodiment, the rotation angle of the sub-drum 50 is measured during the rotation of the sub-drum and the measured values may be transmitted to the control unit 100. Once determining that the measured rotation angle reaches a preset rotation angle, the control unit 100 controls the brake unit 110 to stop the sub-drum 50.

The sub-drum 50 has variable sliding angles at which the sub-drum 50 is sliding from the brake start point by the wash water held therein and the weight of the laundry. Especially, when the rpm is relatively high, such a sliding angle may be diversified. When the second sensor unit 25 measures the sliding angle of the sub-drum 50 and transmits the measured angle to the control unit 100, the control unit 100 corrects the preset rotation angle. For example, the control unit corrects the preset rotation angle to be smaller when the sliding angle of the sub-drum 50 is large enough for the outer water supply guide 570 to pass by the lower area of the water supply unit 18. In vice versa, the control unit 100 corrects the preset rotation angle value to be larger. At this time, the rpm is 15-25 rpm which are higher than 3 rpm and lower than 40-49 rpm in the conventional washing such that little load may be applied to the drive unit 14. Accordingly, the overload of the drive unit may be prevented and the precise location control of the sub-drum may be facilitated. In other words, after the correcting process is performed to prevent a deviation or an error, the location control of the sub-drum is performed and the precise location control of the sub-drum may be then performed.

Meanwhile, after water is supplied to the drum 30 and the sub-drum 50, the drive unit 14 is implemented to rotate the drum 30 and the sub-drum 50 and perform the washing process.

In case of washing the laundry loaded in the drum 30, washing may be performed through diverse drum drive motions. According to one embodiment of the present invention, a basket motion and a pulsator motion may be implemented to wash the laundry loaded in the drum 30. The basket motion is one motion implemented to rotate only the drum and the pulsator motion is one motion implemented to rotate only the pulsator so as to form water currents in the drum. Accordingly, the washing may be substantially performed in the pulsator motion. Of course, the washing may be performed even in combination of diverse motions as well as such the motions.

Control factors including a combination pattern of motions, a duration of a motion and RPM may be set different according to the selected course. Such control factors may be changed based on information about not only the course but also the options selected by the user. As one example, control factors in the substantially performed course may be changed according to option information such as a contamination level, a water temperature, a dry-spinning RPM, a rinsing frequency and a wash water level.

Accordingly, control factors for washing may be selectable by the user and the selection may be facilitated through diverse user interfaces that are provided in the control panel. The user interfaces may be configured to perform the washing for the drum 30.

However, when the sub-drum 50 is mounted in the drum 30 to perform washing, it is preferred that diverse washing courses are provided to perform washing for the sub-drum 50. As one example, a special course for lingerie or delicate clothing needs to be performed in the sub-drum 50 or another special course for cleaning tools with severe contamination needs to be performed in the sub-drum 50.

In the basket motion, the drum is rotated and thus the sub-drum 50 is also integrally rotated with the drum. Accordingly, it is possible to realize a plurality of courses for the sub-drum 50 by changing the duration or RPM of the basket motion.

In other words, it is possible to perform a specific course for the sub-drum simultaneously or combinedly together with a specific course for the drum. However, in this instance, it is not easy to further provide an auxiliary user interface in the control panel to select a course for the sub-drum or a corresponding option to the selected course.

Figure 8:
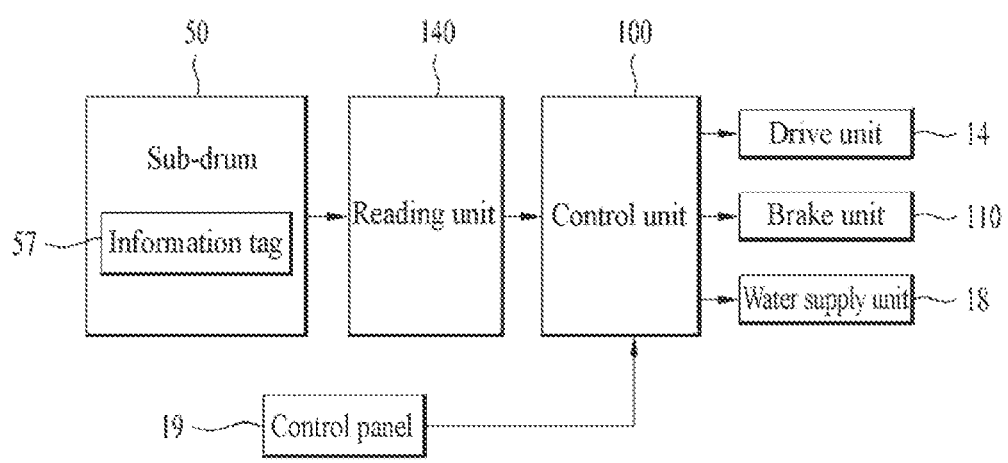
FIG. 8 is a block diagram illustrating a structure of a laundry treating apparatus in accordance with another embodiment.

To solve such a disadvantage, according to one embodiment as shown in FIG. 8, the laundry treating apparatus may further include an information tag 57 provided in the sub-drum 50 and having information about the laundry; and a reading unit 140 configured to acquire the information about the laundry from the information tag 57.

The control unit 100 may determine a washing course for the sub-drum 50 by using the information acquired by the reading unit 140. More specifically, washing courses according to information about the laundry may be preset. Once acquiring the information about the laundry from the reading unit 140, a corresponding one of the preset washing courses to the acquired information about the laundry may be determined as the current washing course to be performed.

Types of the laundry which can be loaded into the sub-drum 50 may be very diverse. As one example, the diverse types of the laundry may include lingerie, delicate clothing, infant clothes, socks, sportswear, towels, jeans, T-shirts and the like. Accordingly, the types of the laundry can be specified by using the information tag 57. When the type of the laundry is specified, a corresponding washing course may be specified according to the specified type of the laundry.

As one example, when delicate clothing is specified by the information tag 57, a corresponding course to the delicate clothing may be specified. In this instance, the duration of the basket motion may be relatively shorter and RPM may be then relatively lower in the basket motion. On the other hand, when socks are specified by the information tag 57, a corresponding course to the socks may be specified. In this instance, the duration of the basket motion may be relatively longer and RPM in the basket motion may be relatively higher.

A plurality of such information tags 57 may be provided and each of the information tags may be corresponding to each course or laundry information. In other words, a specific information tag 57 may be corresponding to lingerie or delicate clothing and another specific information tag 57 may be corresponding to clothes such as jeans or socks. Accordingly, the user is able to figure out types of the laundry to wash in advance and mount corresponding information tags 57 to the sub-drum 50.

A plurality of such sub-drums 50 may be provided. In other words, a specific information tag 57 may be mounted to each of the sub-drums 50. Accordingly, the user is able to figure out types of the laundry to wash in advance and mount a corresponding sub-drum 50 in the drum 30.

The information tag 57 may be Radio Frequency Identification (RFID). In this instance, such a RFID tap has a preset memory region to memorize various tips of information and the memory region may be a kind of a memory chip configured to record various tips of information or additional information.

In case the information tag 57 is configured of the RFID tag, the reading unit 140 may transceive a signal with the RFID tag and receive a signal from the RFID tag. In other words, the reading unit 140 may receive and reflect the information about the laundry or the washing courses from the information tag 57 so as to perform washing.

Meanwhile, the information tag 57 may be configured of a magnet tag including one or more magnets. Together with that, the reading unit 140 may include a hall sensor 55 provided in an upper end of the tub 30 to sense the magnet of the magnet tag; and a rotation angle sensing unit 25 configured to sense the rotation angle of the drum.

In this instance, the first magnet unit 56 of the first sensor unit 54 may perform the function of the magnet tag and the first hall sensor 55 of the first sensor unit 56 and the second sensor unit 25 mentioned above may be the hall sensor of the reading unit 140 and the rotation angle sensing unit 25. Different from the first mange unit 56 of the first sensor unit 54, the information tag 57 includes one or more magnets.

Similar to the first magnet unit 56 of the first sensor unit 54, the information tag 57 may be provided in an upper surface of the sub-drum 50 and the hall sensor 55 may be provided in the tub cover 21 to precisely sense the magnet.

A preset number of such information tags 57 may be arranged along the circumferential surface of the sub-drum 50, for example. In this instance, it is not excluded that one magnet is provided.

The reading unit 140 may sense the number of the magnets while the sub-drum 50 is rotated to a preset rotation angle. For example, the magnets of the information tag 57 may be provided in the upper surface of the sub-drum 50 as shown in FIG. 8 and the preset number of the magnets may be provided along the circumferential surface of the sub-drum 50. The hall sensor 55 may sense the number of the magnets while the sub-drum 50 is rotated to a preset angle and the rotation angle sensing unit 25 may sense the rotation angle of the sub-drum 50.

The information about the laundry may be stored as the number of the sensed magnets while the sub-drum 50 is rotated to the preset angle. In this instance, the control unit 100 may determine a washing course which will be performed based on the information about the laundry.

Meanwhile, as another example, the information tags 57 may have a preset number of magnets arranged along the circumferential surface of the sub-drum 50, spaced a preset angle apart from each other. In this instance, the plurality of the magnets may be provided.

Figure 9:
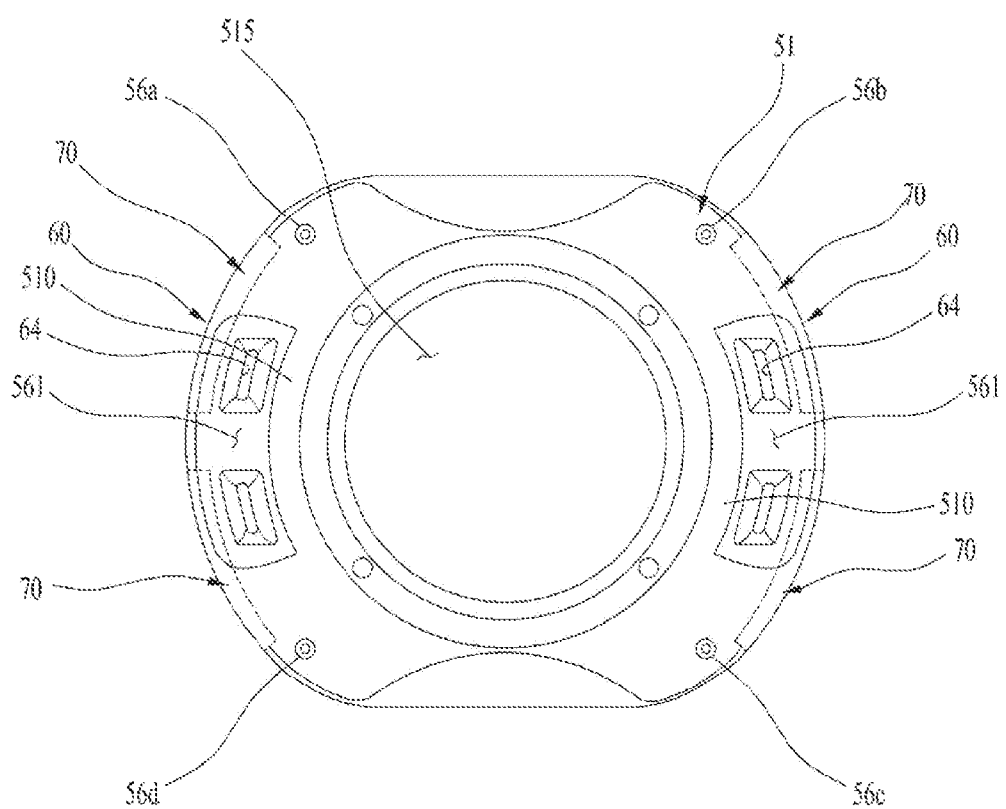
FIG. 9 is a plane view illustrating a sub-drum mounted in a drum.
Figure 10:
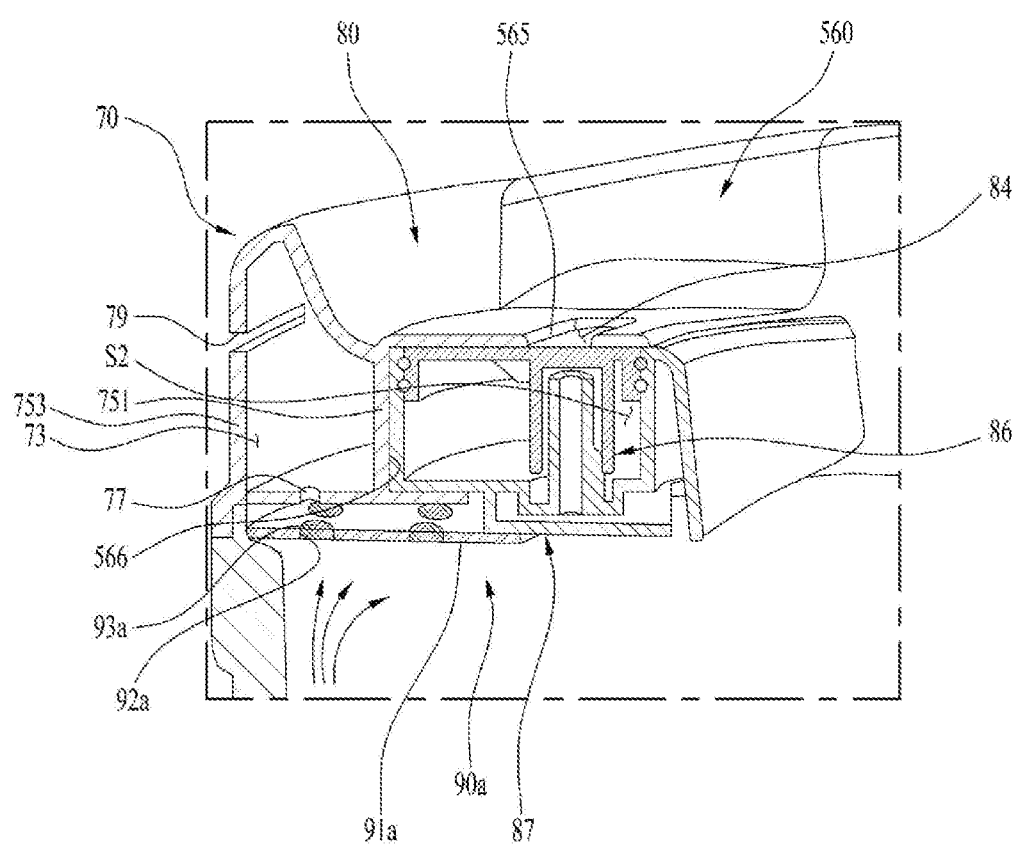
Figure 11:
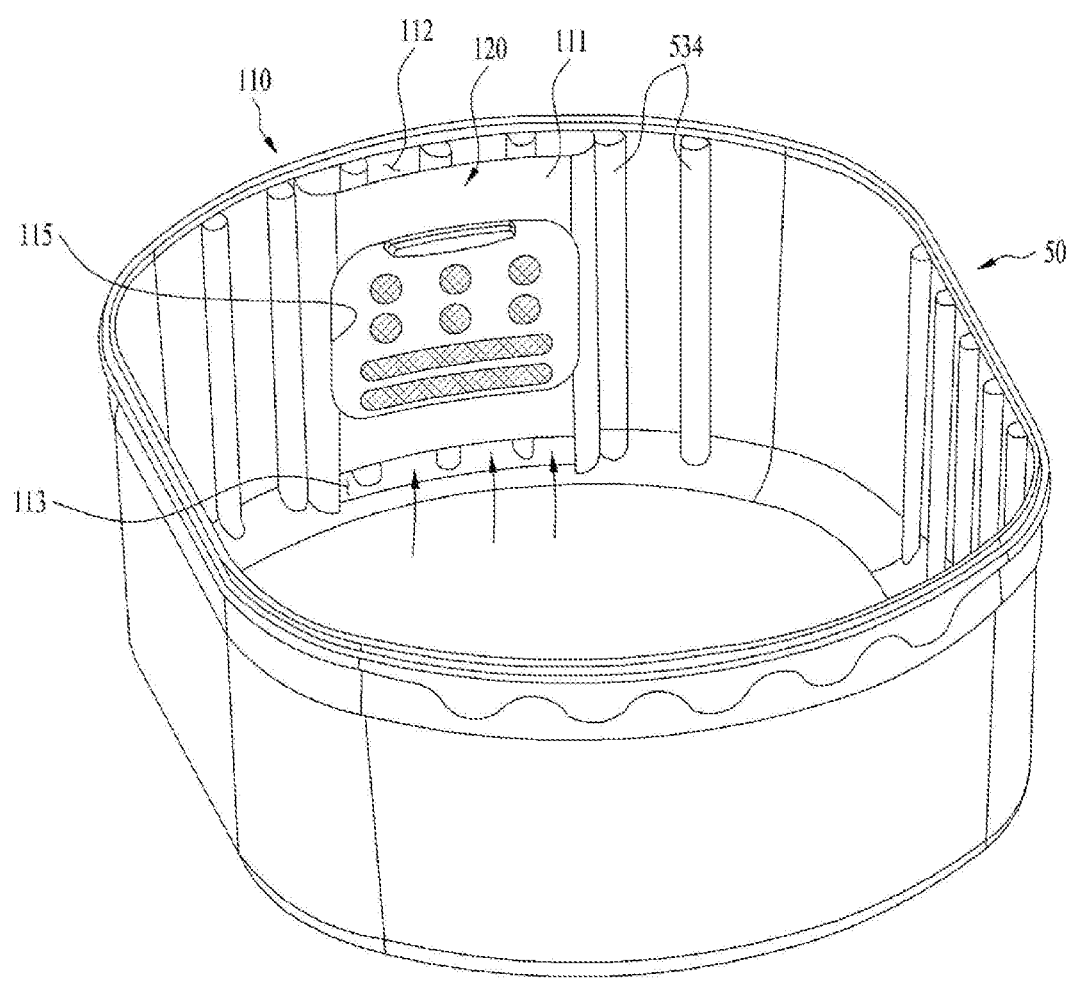
Figure 12:
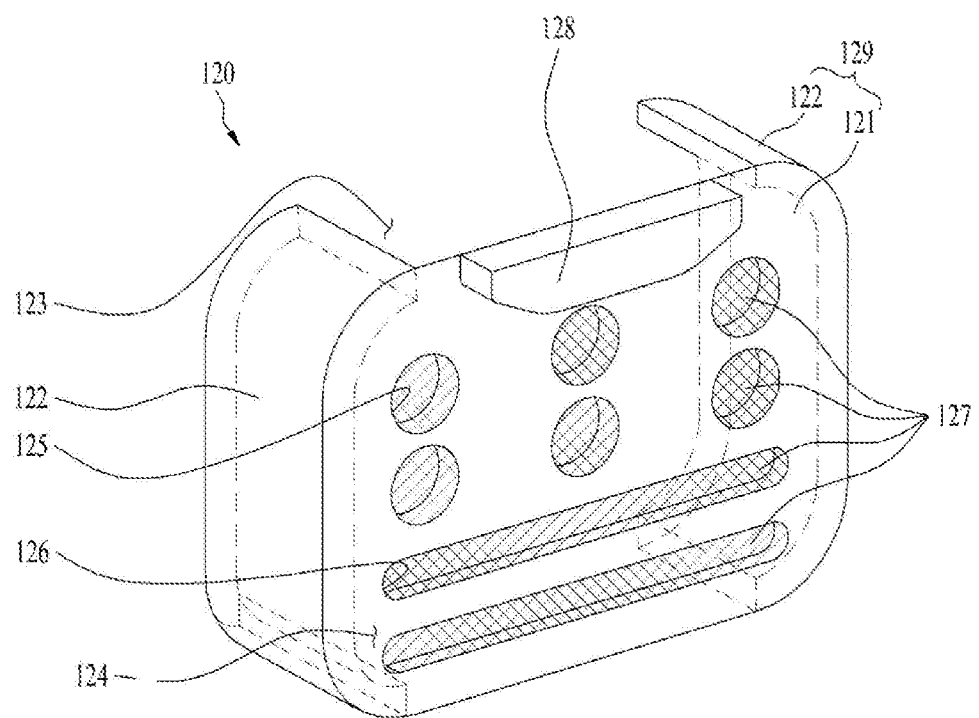
Figure 13:
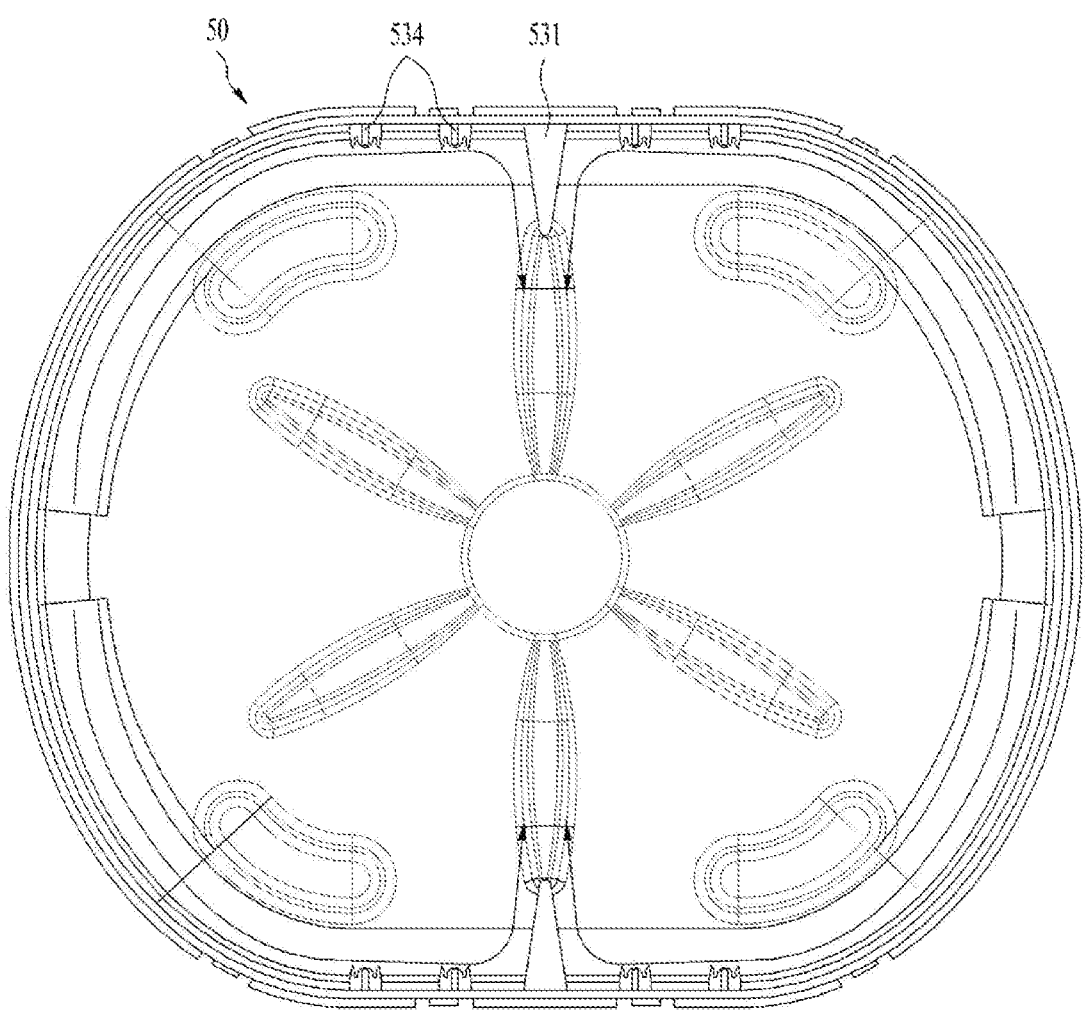
Figure 14:
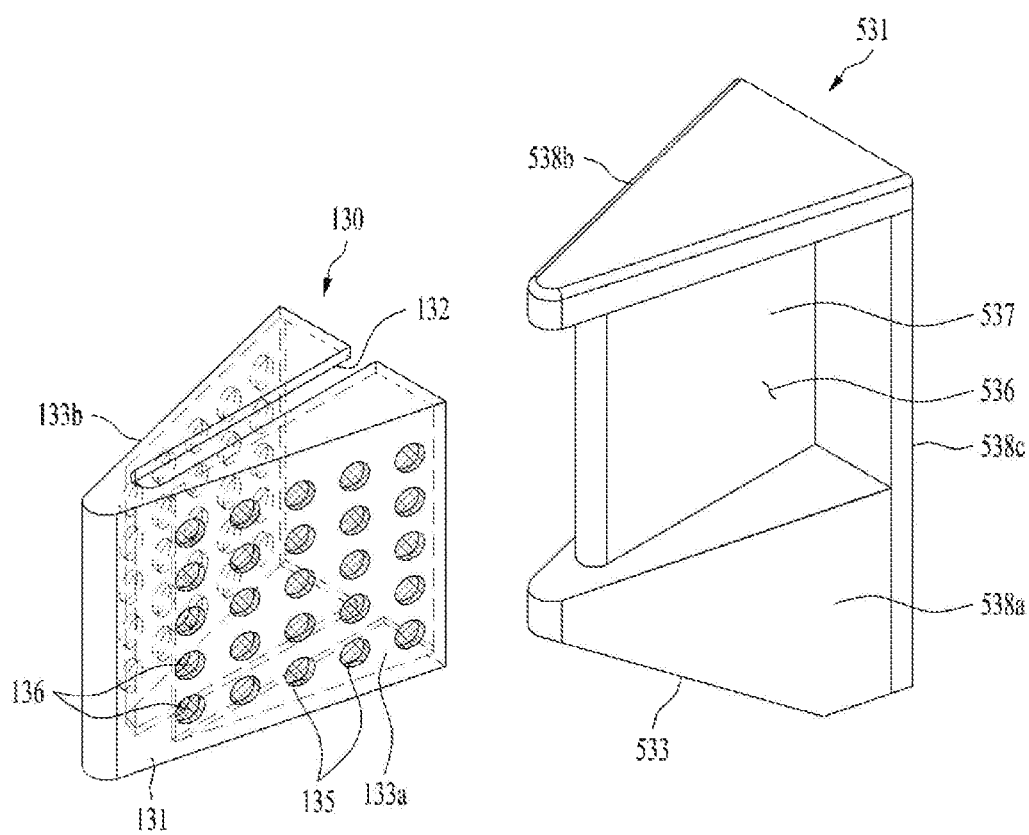
Figure 15:
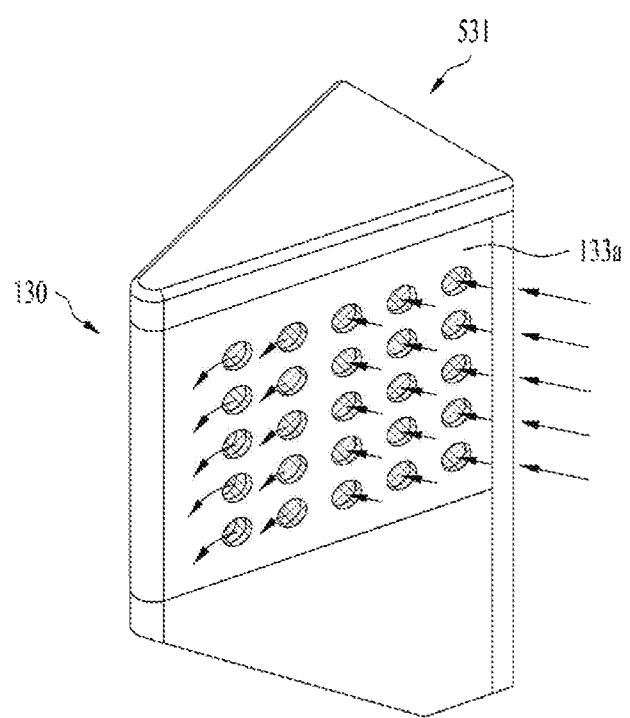

The reading unit 140 may sense the rotation angle of the sub-drum 50 between points at which the magnets are sensed. For example, the magnets of the information tag 57 shown in FIG. 9 may be spaced as far as different angles apart from each other. While the hall sensor 55 of the reading unit 140 senses the magnets two times, the rotation angle sensing unit 25 of the reading unit may sense the rotation angle of the sub-drum 50.

In this instance, the magnets of the magnet tag may include two magnets that are spaced a preset angle apart from each other as one example. The hall sensor 55 of the reading unit 140 sequentially senses the two magnets and the rotation angle sensing unit 25 sense the rotation angle of the sub-drum 50 while the hall sensor 25 performs the sensing two times. Accordingly, the angle between the two magnets spaced apart from each other can be sensed.

The laundry information may be stored as the angle between the two magnets spaced apart from each other. When the angle between each two of the magnets provided in the plural sub-drums 50, respectively, is set different, information about the laundry loaded in each of the plural sub-drums 50 may be distinguished from each other. In this instance, the control unit 100 may determine a washing course, which will be performed, by using such the information about the laundry.

The magnets of the magnet tag may include first to fourth magnets as another example. An angle between the first and second magnets 56a and 56b, an angle between the second and third magnets 56b and 56c and an angle between the third and fourth magnets 56c and 56d may be set different from each other.

Moreover, the preset angles may be arranged to have various combinations of the angles which become sequentially larger or smaller.

The laundry information may be stored as such combinations of the angles and the control unit 100 may determine a washing course, which will be performed later, by using the laundry information. Of course, it is possible to figure out the laundry information by using the combination configured to vary the number of the magnets.

As one example, when four magnets are arranged, the number of the arranged magnets may be varied to vary the laundry information. The positions of the four magnets may be varied to vary the laundry information.

When the rotation angle of the sub-drum 50 is sensed by a sensorless method, the reading unit 140 may allow a phase current having a consistent frequency to the motor and then estimate the location of the rotor 15 provided in the motor based on the output current detected while the current having the consistent frequency is flowing to the motor.

Accordingly, it is possible to set the washing courses of the sub-drum to be variable by the combined number and/or positions of the magnets and also to determine whether the sub-drum is mounted by using the magnets. Accordingly, the control unit 100 may figure out whether the sub-drum is mounted and the washing course for the sub-drum by using the reading unit 140 such as the hall sensor 55. In other words, the washing course proper to the laundry loaded in the sub-drum can be performed even unless the user additionally selects the washing course for the sub-drum through the control panel.

Meanwhile, the plurality of the sub-drums 50 may have stickers that are provided on the outer surfaces, respectively, to display the information contained in the corresponding information tags 57, respectively. Accordingly, the user is able to find out the sticker displaying the corresponding information to the laundry to wash and load the laundry in the sub-drum having the sticker attached thereto before progressing the washing. In other words, a detachable sticker is provided in each of the sub-drums 50 and the information about the laundry may be provided in the sticker. Accordingly, each of the stickers may have information about a specific washing course. When trying to wash delicate fabric clothes by using the sub-drum, the user may amount the sticker corresponding to the delicate clothing to the sub-drum and the reading unit 140 may figure out the information about the course from the sticker.

Washing courses according to the laundry information may be pre-input to the control unit 100. Such the washing courses may be configured of a normal course, a strong course, a quick course, a lingerie/wool course. Each of the washing courses may be preset to correspond to the information about the laundry. As one example, the normal course may be used when washing typical clothes and the lingerie/wool course may be used in washing underwear that is easily damaged or deformed.

The reading unit 140 may be configured of the RFID information tag 57 and the magnet information tag having one or more magnets. In other words, the reading unit 140 may include the hall sensor 55 provided in the upper end of the tub to sense the magnet of the magnet information tag; and the rotation angle sensing unit 25 configured to sense the rotation angle of the drum. The reading unit may receive a signal from the RFID tag while transceiving a signal with the RFID tag.

The sticker may be provided as the information tag 57 and the reading unit 140 may figure out the laundry information from RFID. At this time, once the reading unit 140 figures out the laundry information, it may be sure that the sub-drum 50 is mounted in the drum 30. Accordingly, it may be possible to determine whether the sub-drum 50 is mounted and figure out the laundry information simultaneously.

Using the RFID tag, it may be figured out whether the sub-drum 50 is mounted and also the information about the washing course. The control unit 100 may perform the optimized course for the sub-drum based on the figured-out information.

Meanwhile, the laundry treating apparatus 1 in according to one embodiment may include a contamination level sensor (not shown) configured to sense a contamination level of washing objects.

Accordingly, the control unit 100 may select a proper washing course based on a contamination level of the laundry as well as the information acquired from the information tag 57.

Hereinafter, the operation of the laundry treating apparatus 1 according to one embodiment will be described more specifically.

The sticker having information about the laundry may be attached to the sub-drum 50. The plurality of the stickers may have corresponding laundry, respectively. The user is able to provide information about the course by attaching the desired sticker to the sub-drum 50. In other words, the user finds out a sticker having the same information with the information of the laundry desired to wash and attaches the sticker to the sub-drum 50. After that, the user loads the laundry into the sub-drum 50 and mounts the sub-drum 50 holding the laundry in the drum.

Once the sub-drum 50 is mounted in the drum, the reading unit 140 may acquire a signal from the RFID tag.

The reading unit 140 transmits the acquired the signal to the control unit 100 and the control unit 100 may then determine the proper washing course based on the acquired information.

Meanwhile, the plurality of the sub-drums may be provided and a specific sticker may be attached to each of the sub-drum. In this instance, the user does not have to detach the sticker. In other words, the user is able to load the laundry in the sub-drum having the specific sticker attached thereto and mount the sub-drum having the sticker in the drum.

Meanwhile, in case the magnet tag, not the RFID tag, is provided in the sub-drum 50, the reading unit 140 is not able to acquire information about the laundry from the magnet tag only unless the sub-drum 50 is rotated.

Accordingly, the control unit 100 controls the drive unit to rotate the sub-drum 50 unless receiving the information about the laundry from the reading unit 140 for a reference time period.

Once the sub-drum 50 is rotated, information about the laundry is acquired by the hall sensor 55 and the rotation angle sensing unit 25 of the reading unit 140.

When the reading unit 140 transmits the acquired signal to the control unit 100 after that, the control unit 100 determines the washing course based on the acquired information.

Once the washing course is determined, the control for positioning the sub-drum 50 for water supply may be performed.

Hence, the water supply to the sub-drum 50 and the determined washing course may be performed.

If the contamination level sensor is additionally provided, the control unit 100 may determine the washing course after the water supply is performed. The contamination level sensor measures a turbidity level of the water and then measure a contamination level.

In the present embodiment, the user is able to select a washing course for the sub-drum, without using the control panel.

Such the course selection may be performed by one of the following processes performed by the user.

The course selection may be performed by using the sticker that is detachable from the sub-drum. The user is able to select the course selection by attaching the corresponding sticker to the specific information about the laundry to the sub-drum.

One of the sub-drums may be mounted for every one of the washing courses. The user is able to perform the course selection by mounting the corresponding sub-drum to the specific information in the drum.

Whether the plurality of the magnets is provided and the positions of the magnets may be varied. The user is able to vary the number and positions of the magnets, corresponding to the specific information.

In other words, the user is able to select the washing course by using the information tag according to various methods. The laundry treating apparatus may read the user's intension from the information tag.

Following types of washing may be performed though the above-noted embodiment.

First, when determining that the sub-drum is not mounted by using the reading unit and that the washing course for the main-drum is input via the control panel 19, the control unit 100 may be implemented to perform the washing course for the main-drum.

Second, when determining that the sub-drum is mounted by using the reading unit 140, the control unit 100 may be implemented to perform both the washing for the main-drum and the washing for the sub-drum. The washing course for the main-drum may be input via the control panel by the user and the washing course for the sub-drum may be selected via the information tag by the user.

Last, when determining that the sub-drum is mounted by using the reading unit 140 and that the washing course is not input via the control panel 19, the control panel may be implemented to perform only the washing for the sub-drum. Similarly, the user is able to select the washing course for the sub-drum by using the information tag.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

Industrial applicability of the present disclosure is included in the description of the specific embodiments.

What is claimed is:

1. A laundry treating apparatus comprising:
   a tub configured to hold wash water;
   a drum rotatably supported in the tub, the drum comprising a shaft disposed perpendicular with the ground;
   a sub-drum detachably mounted to an inner circumferential surface of the drum and configured to wash laundry independently from the drum;
   an information tag disposed in the sub-drum, the information tag including information about laundry to be washed in the sub-drum;
   a reading unit configured to acquire the information about the laundry from the information tag; and
   a control unit configured to determine a washing course to be performed in the sub-drum based on the information acquired by the reading unit,
   wherein the control unit is configured to select the washing course from a plurality of predetermined washing courses, and
   wherein the control unit is configured to determine whether the sub-drum is mounted to the drum based on whether the reading unit acquires information from the information tag.

2. The laundry treating apparatus according to claim 1, wherein the control unit is configured to determine that the sub-drum is mounted to the drum when the reading unit acquires information about the laundry from the information tag.

3. The laundry treating apparatus according to claim 1, wherein the information tag is one of a plurality of information tags corresponding to a plurality of washing courses.

4. The laundry treating apparatus according to claim 3, wherein the plurality of information tags are each configured to be detachably mounted in the sub-drum, and
   each of the plurality of information tags is configured to specify a corresponding washing course when each respective information tag is attached to the sub-drum.

5. The laundry treating apparatus according to claim 3, wherein the sub-drum is one of a plurality of sub-drums and each of the plurality of information tags is disposed in a respective one of the plurality of sub-drums.

6. The laundry treating apparatus according to claim 1, wherein the information tag comprises a RFID (Radio Frequency Identification) tag, and
   the reading unit is configured to receive information from the RFID tag.

7. The laundry treating apparatus according to claim 1, wherein the information tag comprises a magnet tag having one or more magnets, and
   the reading unit comprises a hall sensor configured to sense the one or more magnets of the magnet tag.

8. The laundry treating apparatus according to claim 7, wherein the magnet tag comprises a plurality of magnets arranged along a circumferential surface of the sub-drum, and
   the hall sensor is disposed in an upper end of the tub.

9. The laundry treating apparatus according to claim 8, wherein the reading unit further comprises a rotation angle sensing unit disposed in a lower end of the tub and configured to sense a rotation angle of the drum.

10. The laundry treating apparatus according to claim 8, wherein the control unit is configured to determine a washing course by acquiring a frequency sensed by the hall sensor while the drum is rotated to a preset angle.

11. The laundry treating apparatus according to claim 8, wherein the magnet tag comprises a plurality of combinations of a number of the magnets and positions of the magnets, and
    the control unit is configured to determine a washing course by acquiring a sensing frequency of the hall sensor and a rotation angle of the drum measured between sensing points of the hall sensor.

12. A laundry treating apparatus comprising:
    a tub configured to hold wash water;
    a drum rotatably supported in the tub, the drum comprising a shaft disposed perpendicular with the ground;
    a sub-drum detachably mounted to an inner circumferential surface of the drum and configured to wash laundry independently from the drum;
    a control panel configured to enable selection of a first washing course to be performed by the drum;
    an information tag disposed in the sub-drum, the information tag being configured to enable selection of a second washing course to be performed in the sub-drum;
    a reading unit configured to acquire information about the second washing course to be performed in the sub-drum from the information tag; and
    a control unit configured to perform washing according to the first washing course selected via the control panel and the second washing course selected via the information tag,
    wherein the information tag is one of a plurality of information tags corresponding to a plurality of washing courses, the sub-drum is one of a plurality of sub-drums, and
    each of the plurality of information tags is attached to a respective one of the plurality of sub-drums.

13. The laundry treating apparatus according to claim 12, wherein the information tag comprises a magnet tag having one or more magnets arranged along a surface of the sub-drum, the information tag corresponding to a plurality of washing courses, wherein each of the washing courses corresponds to a combination of one or more of a number of the one or more magnets, and positions of the one or more magnets.

14. The laundry treating apparatus according to claim 12, wherein the information tag comprises a RFID tag, and
   the reading unit is configured to receive information from the RFID tag.

15. The laundry treating apparatus according to claim 12, wherein the control unit is configured to:
   acquire information about the first washing course to be performed by the drum via the control panel,
   determine that the sub-drum is not mounted to the drum when the reading unit does not acquire information about the second washing course to be performed in the sub-drum, and
   perform washing according to only the first washing course for the drum when it is determined that the sub-drum is not mounted to the drum.

16. The laundry treating apparatus according to claim 12, wherein the control unit is configured to:
   control the reading unit to acquire information about the second washing course for the sub-drum, and
   perform the washing according to only the second washing course for the sub-drum when the control unit determines that the reading unit does not acquire information about the first washing course.

* * * * *